United States Patent
Jung et al.

(10) Patent No.: US 9,867,103 B2
(45) Date of Patent: Jan. 9, 2018

(54) METHOD FOR COMMUNICATING IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Jaewook Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 14/653,992

(22) PCT Filed: Dec. 20, 2013

(86) PCT No.: PCT/KR2013/011985
§ 371 (c)(1),
(2) Date: Jun. 19, 2015

(87) PCT Pub. No.: WO2014/098535
PCT Pub. Date: Jun. 26, 2014

(65) Prior Publication Data
US 2016/0198382 A1    Jul. 7, 2016

Related U.S. Application Data

(60) Provisional application No. 61/740,401, filed on Dec. 20, 2012.

(51) Int. Cl.
*H04W 36/22* (2009.01)
*H04W 48/18* (2009.01)
(Continued)

(52) U.S. Cl.
CPC .......... *H04W 36/22* (2013.01); *H04W 48/16* (2013.01); *H04W 48/18* (2013.01); *H04W 48/06* (2013.01); *H04W 84/12* (2013.01)

(58) Field of Classification Search
CPC . H04W 24/10; H04W 36/0083; H04W 48/16; H04W 36/0066; H04W 36/14;
(Continued)

(56) References Cited

U.S. PATENT DOCUMENTS 9,392,522 B2 *   7/2016   Stojanovski ............ H04L 45/22
2010/0290431 A1  11/2010  Yang et al.
(Continued)

FOREIGN PATENT DOCUMENTS

GB      2473686 A  *  3/2011  ............ H04L 45/22
KR      10-2012-0079152 A    7/2012
WO      WO 2007/111860 A2   10/2007

OTHER PUBLICATIONS

3GPP TS 23.234 V11.0.0 (Sep. 2009); 3rd Generation Partnership Project; Technical Specification Group Services and System Aspects; 3GPP system to Wireless Local Area Network (WLAN) interworking; System description (Release 11), pp. 1-84.

*Primary Examiner* — Hoang-Chuong Vu
(74) *Attorney, Agent, or Firm* — Birch, Stewart, Kolasch & Birch, LLP

(57) ABSTRACT

Provided is a method for communicating performed by a terminal in a wireless communication system. The method comprises receiving from a first access network a second access network search configuration for searching a second access network, and receiving traffic routing criteria from the first access network. The traffic routing configuration specifies traffic routing criteria for processing traffic of the first access network by routing to a second access network, determining a mobility state of the terminal, searching the second access network based on the second access network search configuration, evaluating whether a second access network entity discovered through the search satisfies the traffic routing criteria, and processing the traffic of the first access network through the second access network entity.

(Continued)

The second access network searching and/or the traffic routing criteria satisfaction evaluating is performed based on the mobility state of the terminal that is determined.

11 Claims, 18 Drawing Sheets

(51) Int. Cl.
  *H04W 48/16* (2009.01)
  *H04W 48/06* (2009.01)
  *H04W 84/12* (2009.01)

(58) Field of Classification Search
  CPC ... H04W 36/22; H04W 48/18; H04W 84/005; H04W 76/023; H04W 36/26
  See application file for complete search history.

(56) References Cited

U.S. PATENT DOCUMENTS

| | | | |
|---|---|---|---|
| 2011/0075675 A1* | 3/2011 | Koodli | H04L 12/14 370/401 |
| 2011/0134882 A1* | 6/2011 | Aoyama | H04W 36/0066 370/331 |
| 2011/0171953 A1 | 7/2011 | Faccin et al. | |
| 2012/0244903 A1* | 9/2012 | Fong | H04W 8/20 455/517 |
| 2014/0148174 A1* | 5/2014 | Teyeb | H04W 36/0083 455/441 |
| 2014/0235249 A1* | 8/2014 | Jeong | H04W 36/26 455/436 |
| 2015/0038151 A1* | 2/2015 | Dalsgaard | H04W 36/0083 455/444 |
| 2015/0072706 A1* | 3/2015 | Michaelsen | H04W 64/006 455/456.1 |
| 2015/0111579 A1* | 4/2015 | Arunachalam | H04W 36/0083 455/436 |
| 2015/0139189 A1* | 5/2015 | Li | H04W 36/0055 370/331 |
| 2015/0139195 A1* | 5/2015 | Xiao | H04W 36/22 370/332 |
| 2015/0189557 A1* | 7/2015 | Touati | H04W 36/0066 370/332 |
| 2015/0189560 A1* | 7/2015 | Ji | H04W 36/0055 370/331 |

* cited by examiner

METHOD FOR COMMUNICATING IN WIRELESS COMMUNICATION SYSTEM AND APPARATUS SUPPORTING SAME

CROSS REFERENCE TO RELATED APPLICATIONS

This application is the National Phase of PCT International Application No. PCT/KR2013/011985, filed on Dec. 20, 2013, which claims priority under 35 U.S.C. 119(e) to U.S. Provisional Application No. 61/740,401, filed on Dec. 20, 2012, all of which are hereby expressly incorporated by reference into the present application.

BACKGROUND OF THE INVENTION

Field of the Invention

The present invention relates to wireless communication, and more particularly, to a method for moving carried out in a wireless communication system and an apparatus supporting the same.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

The wireless communication system can support providing a service through a plurality of access networks to the terminal. The terminal can receive the service from a 3GPP based access network such as a mobile wireless communication system and further, receive a service from non-3GPP based access networks such as Worldwide Interoperability for Microwave Access (WiMAX), Wireless Local Area Network (WLAN), and the like.

In a wireless communication system, a terminal can change an access network providing a service according to a wireless environment such as the quality of the service which can be provided from the access network or a load of the access network and this is referred to as movement of the terminal. The terminal can receive the service through movement such as changing a serving cell on a 3GPP access network or newly accessing a non-3GPP access network.

The terminal needs to determine the non-3GPP access network positioned therearound in order to efficiently offload some or all traffic being transmitted/received or to be transmitted/received in the 3GPP access network to the non-3GPP access network. Service coverage of the non-3GPP access network such as a WLAN access network may be still smaller than macro cell coverage of the 3GPP access network. Therefore, the terminal needs to continuously activate a module for non-3GPP communication and perform detection in order to discover the non-3GPP access network and effectively offload traffic by using the discovered non-3GPP access network. However, this can rapidly consume power of the terminal. In order to prevent the rapid consumption of the power, the terminal needs to intermittently perform detecting the non-3GPP access network.

SUMMARY OF THE INVENTION

The present invention has been made in an effort to provide a method for communicating based on a mobility state in a wireless communication system and an apparatus supporting the same.

In an aspect, provided is a method for communicating carried by a terminal in a wireless communication system. The method includes receiving from a first access network a second access network detection configuration for detecting a second access network, receiving a traffic routing configuration from the first access network, in which the traffic routing configuration specifies a traffic routing criterion for routing and processing traffic of the first access network to the second access network, deciding a mobility state of the terminal, detecting the second access network based on the second access network detection configuration, determining whether a second access network entity discovered by the detection satisfies the traffic routing criterion and processing the traffic of the first access network through the second access network entity when the traffic routing criterion is satisfied. At least one step of the discovering the second access network and evaluating whether the traffic routing criterion is satisfied is performed based on the decided mobility state of the terminal.

The evaluating whether the traffic routing criterion is satisfied may be performed based on the decided mobility state of the terminal.

The traffic routing criterion may indicate the mobility state of the terminal in which the traffic of the first access network is permitted to be routed and processed to the second access network.

The evaluating whether the traffic routing criterion is satisfied may include deciding that traffic criterion is satisfied when the decided mobility state of the terminal corresponds to the mobility state indicated by the traffic routing criterion.

The traffic routing criterion may indicate the mobility state of the terminal in which the traffic of the first access network is not permitted to be routed and processed to the second access network.

The evaluating whether the traffic routing criterion is satisfied may include deciding that traffic criterion is satisfied when the decided mobility state of the terminal does not correspond to the mobility state indicated by the traffic routing criterion.

The detecting of the second access network may be performed based on the decided mobility state of the terminal.

The second access network detection configuration includes one or more detection parameters for specifying a second access network detection period according to the mobility state of the terminal The detecting of the second access network may include activating a function for communication with the second access network during the specified second access network detection period according to the decided mobility state of the terminal, and scanning the second access network during the second access network detection period.

The second access network detection configuration may include a detection parameter set specifying the second access network detection period, and one or more scaling parameter sets scaling the second access network detection period according to the mobility state of the terminal.

The detecting of the second access network may include scaling the second access network detection period by applying a scaling parameter set corresponding to the decided mobility of the terminal, activating the function for the communication with the second access network during the scaled second access network detection period, and scanning the second access network during the scaled second access network detection period.

The first access network may be a 3rd generation partnership project (3GPP) based access network, and the second access network may be a wireless local area network (WLAN) based access network.

In another aspect, provided is a wireless apparatus that operates in a wireless communication system. The wireless apparatus includes a radio frequency (RF) unit which transmits or receives a radio signal and a processor which operates in functional association with the RF unit. The process is configured to receive from a first access network a second access network detection configuration for detecting a second access network, receive a traffic routing configuration from the first access network, in which the traffic routing configuration specifies a traffic routing criterion for routing and processing traffic of the first access network to the second access network, decide a mobility state of the wireless apparatus, detect the second access network based on the second access network detection configuration, evaluate whether a second access network entity discovered by the detection satisfies the traffic routing criterion, and process the traffic of the first access network through the second access network entity when the traffic routing criterion is satisfied, and at least one step of the discovering of the second access network and the evaluating whether the traffic routing criterion is satisfied is performed based on the decided mobility state of the terminal.

In interworking between a 3GPP access network and a non-3GPP access network, a terminal can rapidly discover the non-3GPP access network and maximally use the discovered access network by adjusting a parameter for measuring the non-3GPP access network according to a mobility state of the terminal. Therefore, an operator can effectively control a load of the 3GPP access network. Further, under a situation in which traffic cannot be effectively offloaded to a small cell because a speed of the terminal is too high, the terminal finds the small cell such as a WLAN and does not perform a procedure for processing the traffic in the corresponding cell to prevent unnecessary battery consumption due to the operation.

DESCRIPTION OF EXEMPLARY EMBODIMENTS

Figure 1:
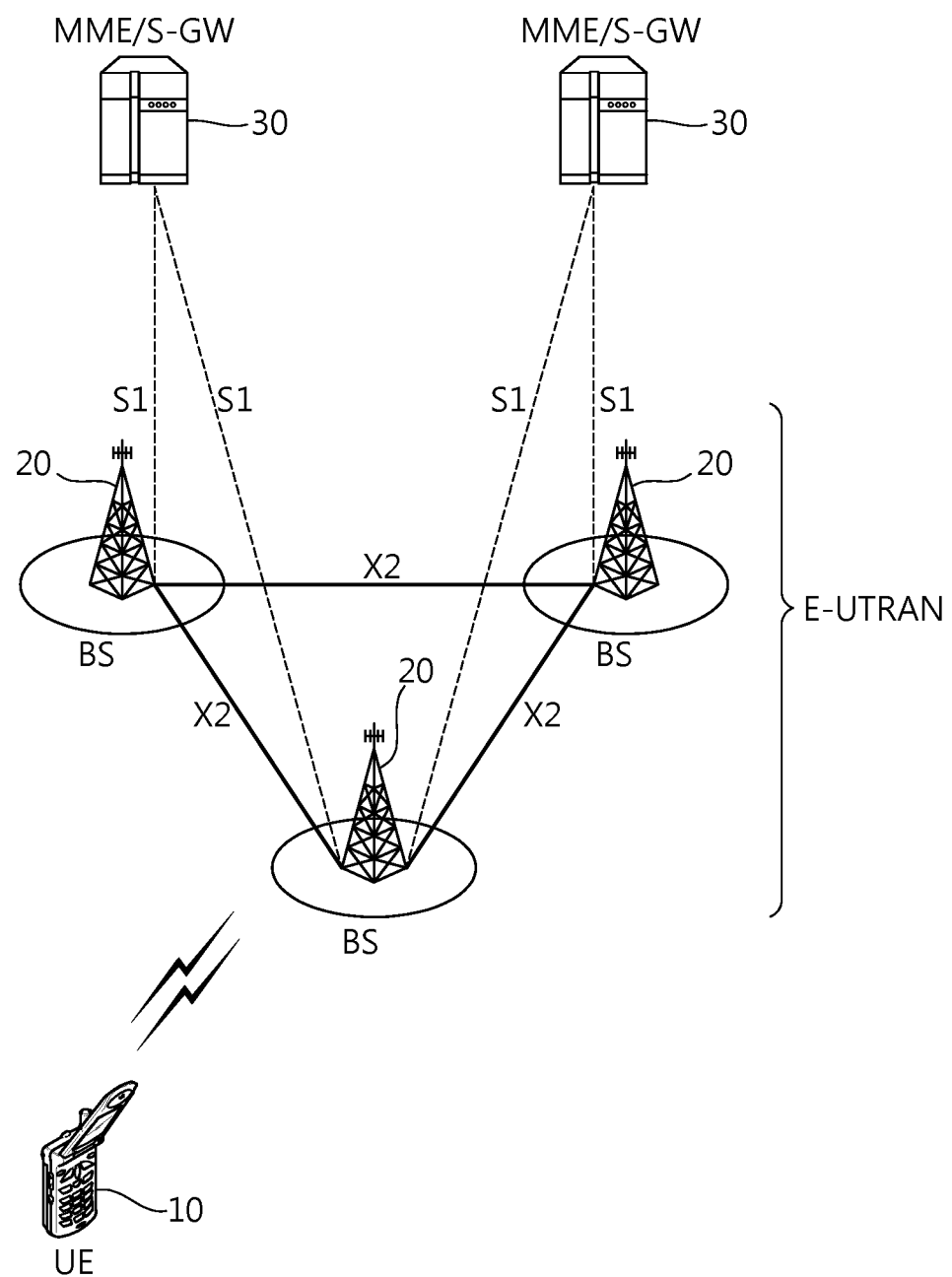
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
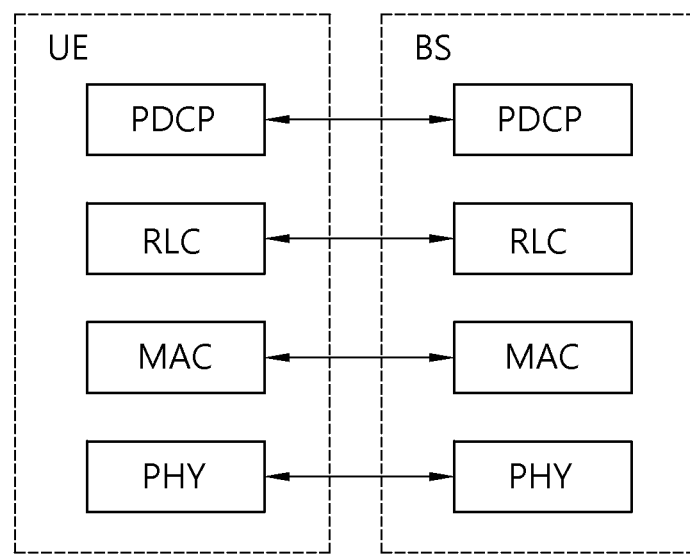
FIG. 2 is a block diagram illustrating a radio protocol architecture for a user plane.
Figure 3:
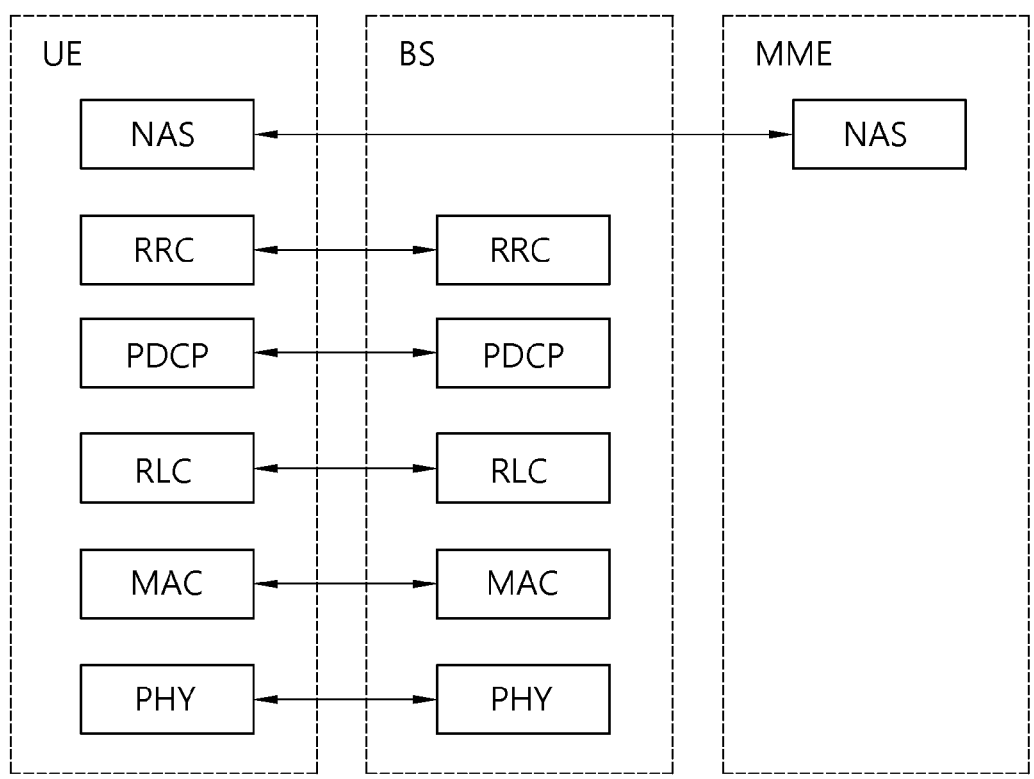
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane.

The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

As disclosed in 3GPP TS 36.211 V8.7.0, a physical channel in 3GPP LTE may be divided into the physical downlink shared channel (PDSCH) and a physical uplink shared channel (PUSCH) which are data channels, and a physical downlink control channel (PDCCH), a physical control format indicator channel (PCFICH), a physical hybrid-ARQ indicator channel (PHICH), and a physical uplink control channel (PUCCH) which are data channels.

The PCFICH transmitted in a first OFDM symbol of the subframe transports a control format indicator (CFI) regarding the number (that is, the size of the control region) of OFDM symbols used to transmit control channels in the subframe. The terminal first receives the CFI on the PCFICH and thereafter, monitors the PDCCH.

The PDCCH as a downlink control channel is also referred to as a scheduling channel in terms of transporting scheduling information. Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP).

In 3GPP LTE, the terminal uses blind decoding in order to detect the PDCCH. The blind decoding is a scheme that checks a CRC error by demasking a desired identifier to a CRC of a received PDCCH (referred to as a PDCCH candidate) to check whether the corresponding PDCCH is a control channel thereof.

The base station determines a PDCCH format according to a DCI to be transmitted to the terminal and then adds a cyclic redundancy check (CRC) to the DCI, and masks a unique identifier (referred to as a radio network temporary identifier (RNTI)) to the CRC according to an owner or a usage of the PDCCH.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all terminals. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The terminal may apply acquisition and change sensing procedures of the system information only to a PCell. In an SCell, the E-UTRAN may provide all system information associated with an RRC connection state operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The terminal needs to guarantee validity of specific type system information and the system information is referred to as required system information. The required system information may be defined as follows.

In the case where the terminal is in an RRC idle state: It needs to be guaranteed that the terminal has valid versions of the MIB and the SIB1 as well as the SIB2 to SIB8 and this may be followed by supporting a considered RAT.

In the case where the terminal is in an RRC connection state: It needs to be guaranteed that the terminal has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
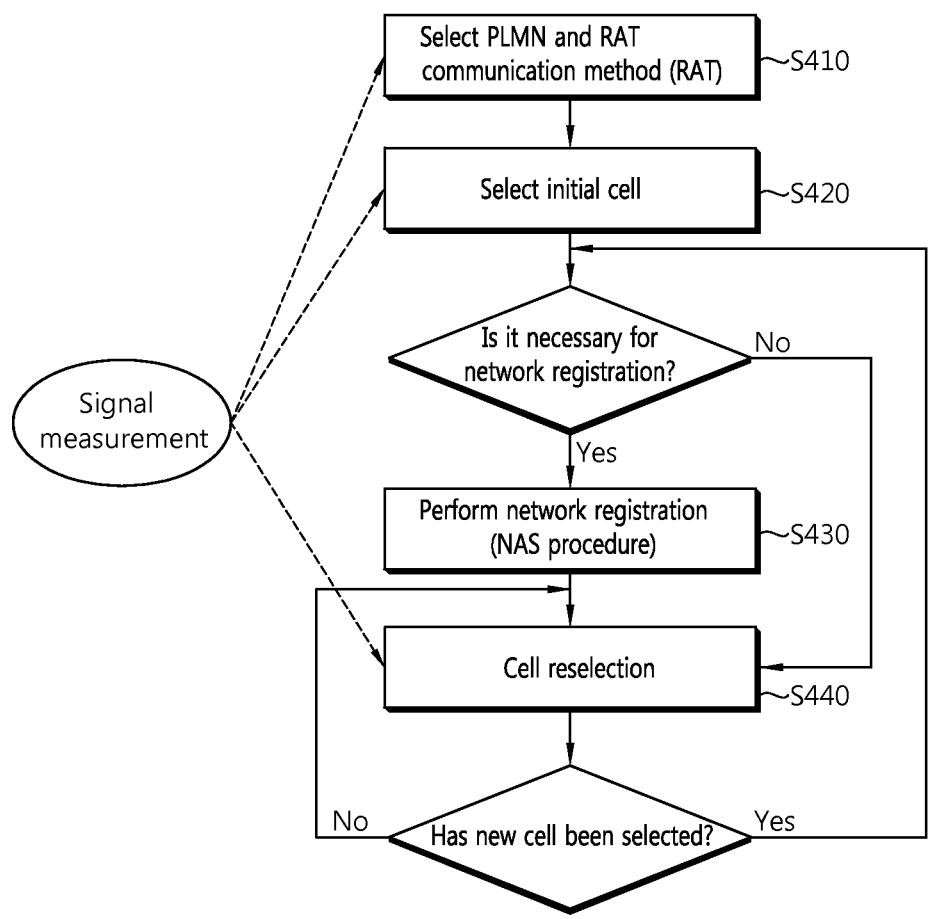
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
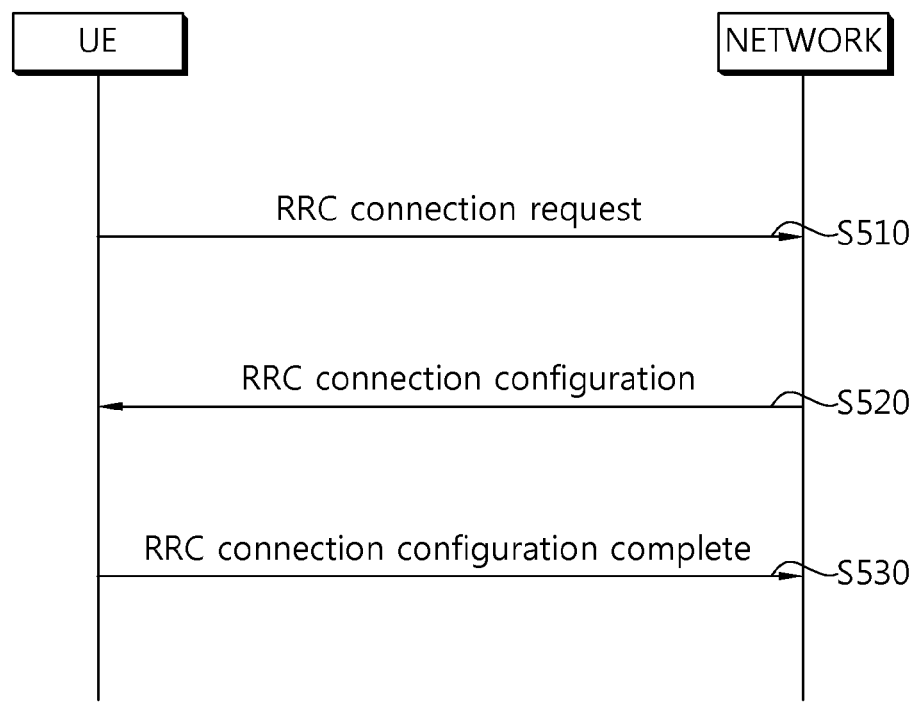
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
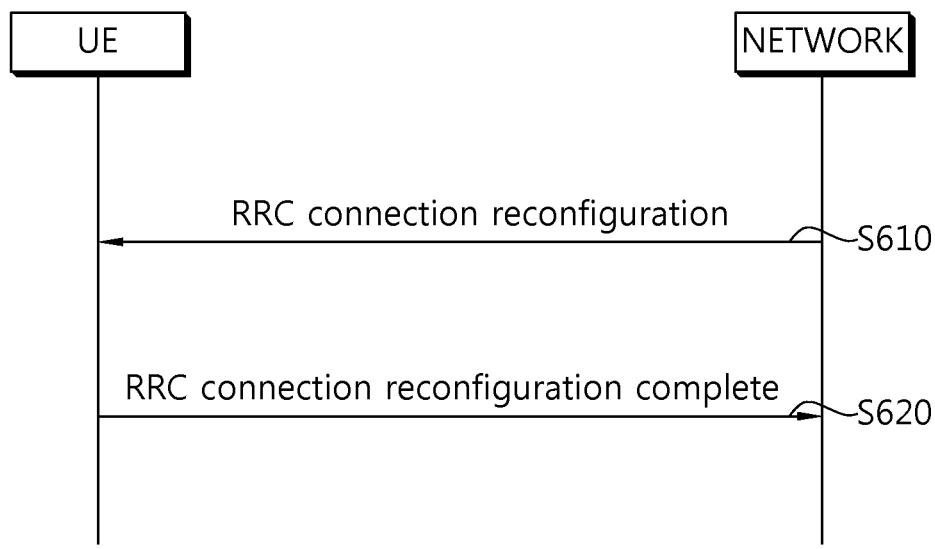
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN (Public Land Mobile Network) will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

A cell selection criterion may be defined as shown in Equation 1 given below.

$$S\mathrm{rxlev}>0 \text{ AND } S\mathrm{qual}>0 \qquad \text{[Equation 1]}$$

where:
$S\mathrm{rxlev}=Q_{rxlevmeas}-(Q_{rxlevmin}+Q_{rxlevminoffset})-\text{Pcompensation}$
$S\mathrm{qual}=Q_{qualmeas}-(Q_{qualmin}+Q_{qualminoffset})$ Herein, each variable of Equation 1 may be defined as shown in Table 1 given below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$ which are signaled values as a result of a periodic search for a PLMN having a higher priority while the terminal camps on a normal cell may be applied only when cell selection is evaluated. During the periodic search for the PLMN having the higher priority, the terminal may perform the cell selection evaluation by using parameter values stored from another cell of the PLMN having the higher priority.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, R_n = Q_{meas,n} - Q_{offset} \quad \text{[Equation 1]}$$

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

When the terminal (UE) perform cell reselection according to the cell reselection evaluation, the terminal may decide that a cell reselection criterion is satisfied when the cell reselection criterion is satisfied for a specific time and move the cell to the selected target cell. Herein, the specific time may be given from the network as a Treselection parameter. The Treselection may specify a cell reselection timer value and be defined with respect to each frequency and another RAT of the E-UTRAN.

Hereinafter, cell reselection information used for the cell reselection by the terminal will be described.

The cell reselection information may be transmitted while being included in the system information broadcasted from the network in a format of the cell reselection parameter and provided to the terminal. The cell reselection parameter provided to the terminal may include the following types.

Cell Reselection Priority: The cellReselectionPriority parameter specifies the priority of a frequency of the E-UTRAN, a frequency of the UTRAN, a group of GERAN frequencies, a band class of CDMA2000 HRPD, or a band class of CDMA2000 1×RTT.

$Qoffset_{s,n}$: Specifies an offset value between two cells.

$Qoffset_{frequency}$: Specifies a frequency specific offset for the E-UTRAN having the same priority.

$Q_{hyst}$: Specifies a hysteresis value for a rank index.

$Q_{qualmin}$: Specifies a minimally required quality level and specified by the unit of dB.

$Q_{rxlevmin}$: Specifies a minimally required Rx level and specified by the unit of dB.

$Treselection_{EUTRA}$: Specifies the cell reselection timer value for the E-UTRAN and may be configured with respect to each frequency of the E-UTRAN.

Treselection$_{UTRAN}$: Specifies the cell reselection timer value for the UTRAN.

Treselection$_{GERA}$: Specifies the cell reselection timer value for the GERAN.

Treselection$_{CDMA\_HRPD}$: Specifies the cell reselection timer value for the CDMA HRPD.

Treselection$_{CDMA\_1 \times RTT}$: Specifies the cell reselection timer value for the CDMA 1×RTT.

Thresh$_{x,HighP}$: An Srxlev threshold value used by the terminal when reselection to an RAT/frequency having a higher priority than a serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

Thresh$_{x,HighQ}$: An Squal threshold value used by the terminal when reselection to the RAT/frequency having the higher priority than the serving frequency is specified by the unit of dB. Specific threshold values may be individually configured with respect to each frequency of the E-TRAUN and the UTRAN FDD.

Thresh$_{x,LowP}$: The Srxlev threshold value used by the terminal when reselection to an RAT/frequency having a lower priority than the serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

Thresh$_{x,LowQ}$: The Squal threshold value used by the terminal when reselection to the RAT/frequency having the lower priority than the serving frequency is specified by the unit of dB. Specific threshold values may be individually configured with respect to each frequency of the E-TRAUN and the UTRAN FDD.

Thresh$_{Serving,LowP}$: The Srxlev threshold value used by the terminal on the serving cell when reselection to the lower RAT/frequency is specified by the unit of dB.

Thresh$_{Serving,LowQ}$: The Squal threshold value used by the terminal on the serving cell when reselection to the lower RAT/frequency is specified by the unit of dB.

$S_{IntraSerachP}$: An Srxlev threshold value for intra-frequency measurement is specified by the unit of dB.

$S_{IntraSerachQ}$: An Squal threshold value for intra-frequency measurement is specified by the unit of dB.

$S_{nonIntraSerachP}$: An Srxleve threshold value for E-UTRAN intra-frequency and inter-RAT measurement are specified by the unit of dB.

$S_{nonIntraSerachQ}$: An Squal threshold value for E-UTRAN intra-frequency and inter-RAT measurement are specified by the unit of dB.

Meanwhile, the cell reselection information may be provided to the terminal while being included in an RRC disconnection message which is an RRC message for RRC disconnection between the network and the terminal. For example, the RRC disconnection message may include a subcarrier frequency list and the cell reselection priority of the E-UTRAN, a subcarrier frequency list and the cell reselection priority of the UTRA-FDD, a subcarrier frequency list and the cell reselection priority of the UTRA-TDD, a subcarrier frequency list and the cell reselection priority of the GERAN, the band class list and the cell reselection priority of the CDMA2000 HRPD, and the band class list and the cell reselection priority of the CDMA2000 1×RTT.

Hereinafter, sharing an RAN by multiple operators will be described.

The multiple operators may provide the service by individually constructing the RAN, but provide the service to a subscriber by sharing a cell constructed by a specific operator. This is referred to as RAN sharing. In this case, the cell shared by the multiple providers may broadcast a PLMN list. The PLMN list may be transmitted while being included in SIB1 of the system information broadcasted by the cell. Meanwhile, a PLMN identifier first listed in the PLMN list included in the SIB1 may be implemented to indicate a primary PLMN.

Under a situation in which one cell is shared by the multiple operators, the cell reselection information provided by the shared cell may be commonly applied to all PLMNs in the PLMN list. In general, the cell reselection information provided by the shared cell is configured to primarily coincide with a policy of the primary PLMN. Therefore, terminals receiving a service depending on a secondary PLMN perform the cell reselection based on information other than the cell reselection information optimized for providing the service.

Hereinafter, the handover related with movement of the terminal in the RRC connection state will be described.

Figure 7:
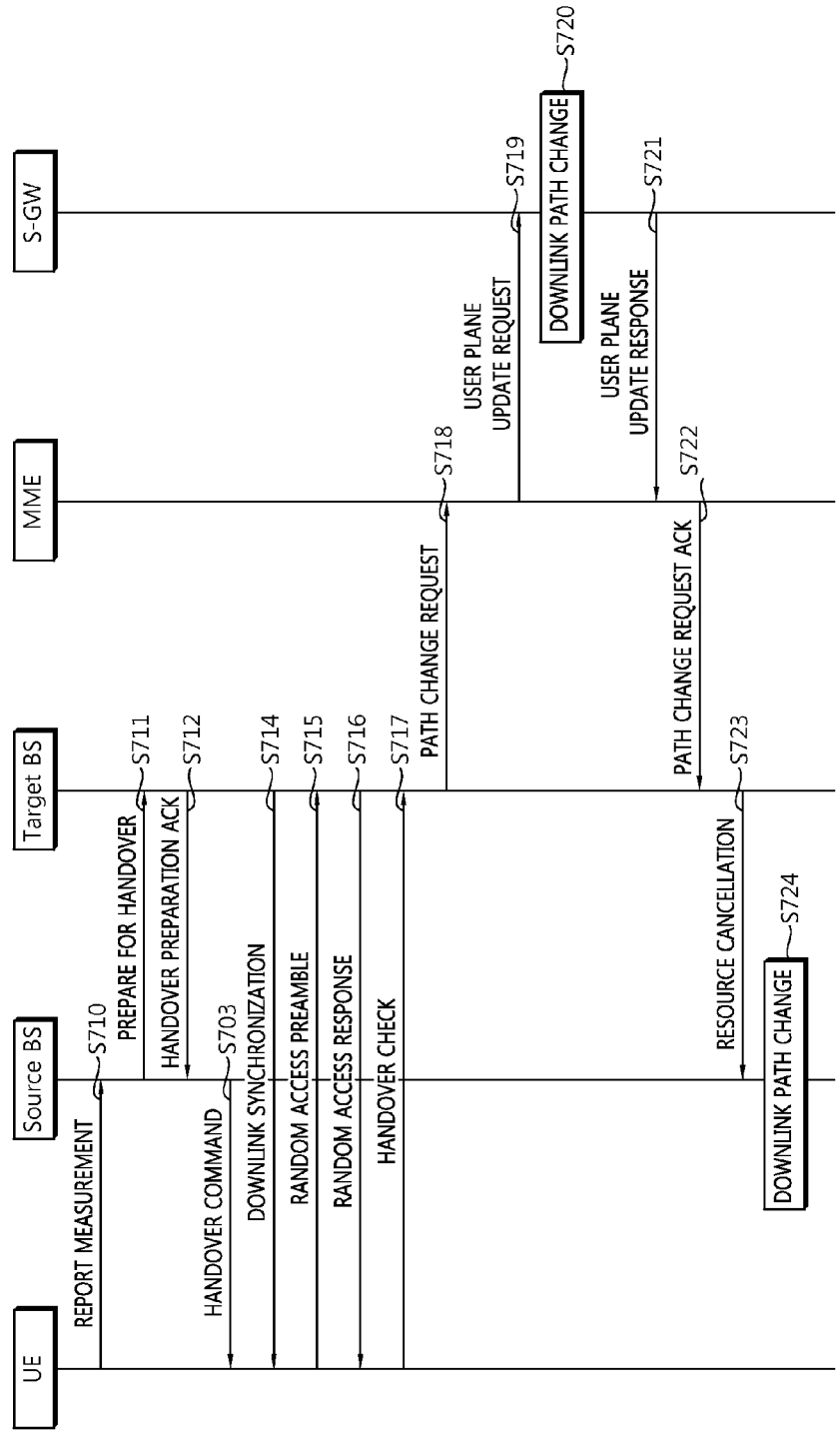
FIG. 7 is a flowchart illustrating a handover process.

FIG. 7 is a flowchart illustrating a handover process.

The terminal (UE) transmits a measurement report to a source base station (BS) (S710). The source base station decides whether to perform the handover by using the received measurement report. When the source base station decides the handover to a contiguous cell, the continuous cell becomes a target cell and a base station that belongs to the target cell becomes a target base station (BS).

The source base station transmits a handover preparation message to the target base station (S711). The target base station performs admission control in order to increase a success possibility of the handover.

The target base station transmits a handover preparation acknowledgement (ACK) message to the source base station (S712). The handover preparation acknowledgement (ACK) message may include a cell-radio network temporary identifier (C-RNTI) and/or a dedicated random access preamble. The C-RNTI is an identifier for identifying the terminal in the cell. The dedicated random access preamble as a preamble which the terminal may exclusively use during a predetermined period is used in performing the non-contention based random access. The random access process may be divided into a contention based random access process using the predetermined random access preamble and the non-contention based random access process using the dedicated random access preamble. The non-contention based random access process may prevent a delay of the handover due to contention with other terminals as compared with the contention based random access process.

The source base station transmits a handover command message to the terminal (S713). The handover command message may be transmitted in a form of a radio resource control (RRC) connection reconfiguration message. The handover command message may include the C-RNTI and the dedicated random access preamble received from the target base station.

The terminal receives the handover command message from the source base station and thereafter, synchronizes with the target base station (S714). The terminal receives a PSS and an SSS of the target base station to synchronize the PSS and the SS and receives the PBCH to acquire the system information.

The terminal transmits the random access preamble to the target base station to start the random access process (S715). The terminal may use the dedicated random access preamble included in the handover command message. Alternatively, if the dedicated random access preamble is not allocated, the terminal may use a predetermined random access preamble selected in a random access preamble set.

The target base station transmits a random access response message to the terminal (S716). The random access response message may include uplink resource allocation and/or time offset (timing advance).

The terminal that receives the random access response message adjusts uplink synchronization based on the time offset and transmits a handover confirm message to the target base station by using the uplink resource allocation (S717). The handover confirm message may indicate that the handover process is completed and be transmitted together with an uplink buffer status report.

The target base station transmits a path switch request message to a mobility management entity (MME).

The MME transmits a user plane update request message to a serving-gateway (S-GW) (S719).

The S-GW switches a downlink data path to the target base station (S720).

The S-GW transmits a user plane update response message to the MME (S721).

The MME transmits a path switch request ACK message to the target base station (S722).

The target base station transmits a resource release message to the source base station to notify the success of the handover (S723).

The source base station release a resource related to the terminal (S724).

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
- a case where the UE determines that there is a serious problem in the downlink communication link quality based on the radio quality measuring result of the PHY layer (determines that the quality of the PCell is low during the RLM.
- a case where the UE determines that there is a problem in the uplink transmission when a random access procedure is continuously failed in a MAC sub-layer.
- a case where the UE determines that there is a problem in the uplink transmission when uplink data transmission is continuously failed in an RLC sub-layer.
- a case where the UE determines that the handover is failed.
- a case where a massage received by the UE does not pass through an integrity check.

Hereinafter, the RRC connection re-establishment procedure will be described in more detail.

Figure 8:
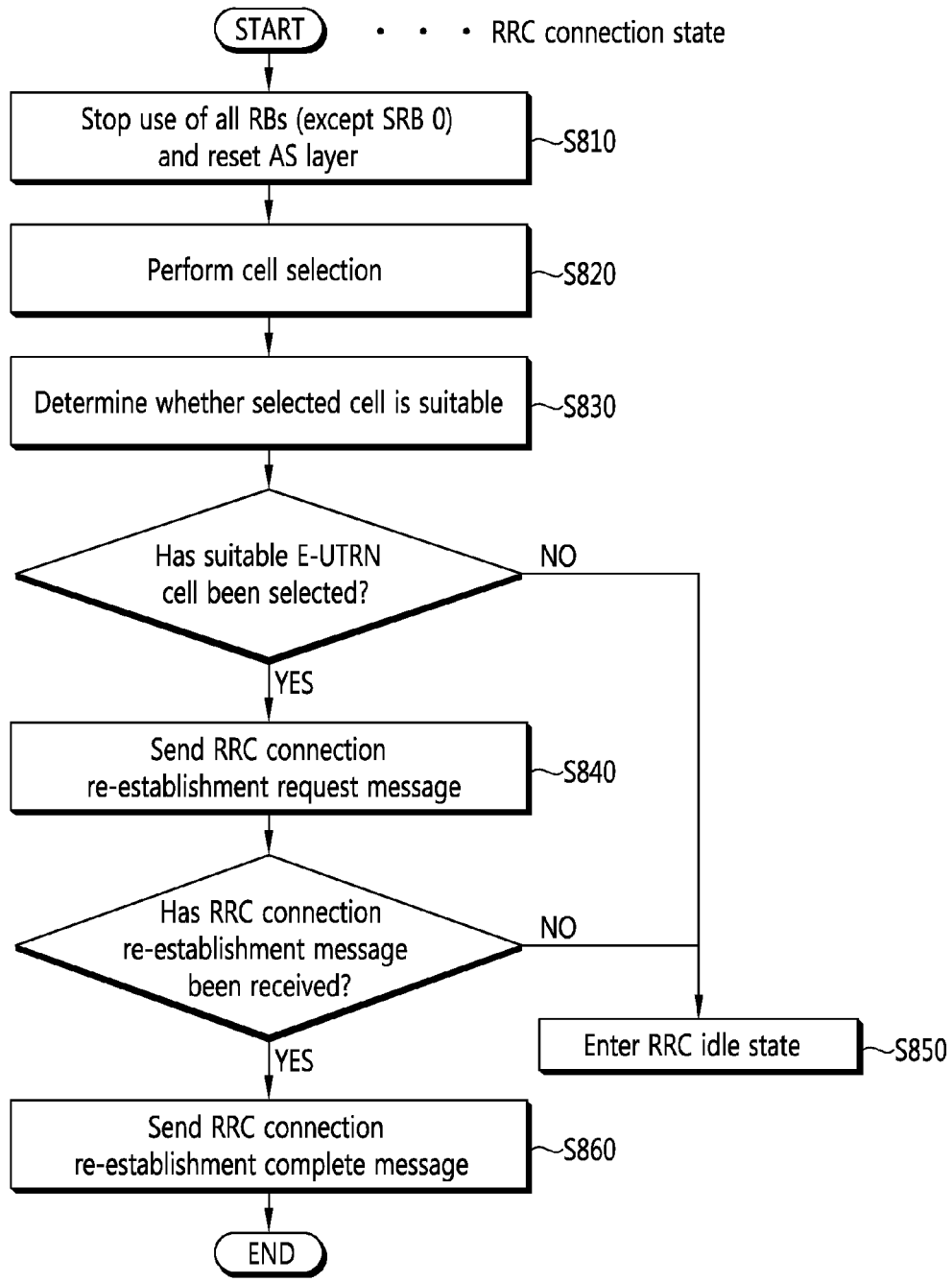
FIG. 8 is a diagram illustrating a RRC connection re-establishment procedure.

FIG. 8 is a diagram illustrating a RRC connection re-establishment procedure.

Referring to FIG. 8, the UE stops the used of all radio bearers which have been set except for signaling radio bearer #0 (SRB 0) and initializes each sub-layer of the AS (S810). Further, each sub-layer and the PHY layer are set as a default configuration. The UE maintains the RRC connection state during such a process.

The UE performs a cell selection procedure for performing the RRC connection reconfiguration procedure (S820). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S830). When it is determined that the selected cell is the suitable E-UTRAN cell, the UE transmits an RRC connection reestablishment request message to the corresponding cell (S840).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S850).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S860).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, a measurement and a measurement report will be described.

In a mobile communication system, supporting mobility of a terminal is required. Accordingly, the terminal continuously measures a quality for a serving cell that provides a current service and a quality for a neighboring cell. The terminal reports a measurement result to a network at an appropriate time and the network provides optimal mobility to the terminal through handover, and the like. Commonly, the measurement for the purpose is called radio resource management (RRM) measurement.

The terminal may perform a measurement for a specific purpose set by the network and reports a measurement result thereof to the network, in order to provide information to help a provider to operate the network in addition to the purpose of supporting the mobility. For example, the terminal receives broadcast information of a specific cell determined by the network. The terminal may report to the serving cell a cell identity (also referred to as a global cell identity) of the specific cell, position identification information (for example, tracking area code) to which the specific cell belongs, and/or other cell information (for example, whether a closed subscriber group (CSG) cell is member).

When the terminal which is moving verifies that a quality in a specific region is very bad through the measurement, positional information and a measurement result regarding cells of which the qualities are bad may be reported to the network. The network may attempt optimization of the network based on the report of the measurement result of the terminals that help operating the network.

In a mobile communication system in which a frequency reuse factor is 1, mobility is most achieved among different cells which are in the same frequency band. Accordingly, in order to well guarantee the mobility of the terminal, the terminal needs to well measure qualities and cell information of neighbor cells having center frequencies which is the same as a center frequency of the serving cell. A measurement for the cell having the center frequency which is the same as the center frequency of the serving cell as described above is called an intra-frequency measurement. The terminal reports the measurement result to the network at an appropriate time by performing the intra-frequency measurement to achieve the purpose of the corresponding measurement result.

A mobile communication provider may operate the network by using a plurality of frequency bands. When a service of the communication system is provided through the plurality of frequency bands, the terminal may need to well measure qualities and cell information of neighbor cells having center frequencies which are different from the center frequency of the serving cell, in order to guarantee optimal mobility for the terminal. As described above, a measurement for the cell having the center frequency which is different from the center frequency of the serving cell is called an inter-frequency measurement. The terminal may need to report the measurement result to the network at an appropriate time by performing the inter-frequency measurement.

When the terminal supports a measurement for the network based on an RAT, the terminal may perform a measurement for a cell of the corresponding network by a configuration by the base station. The measurement is called an inter-radio access technology (RAT) measurement. For example, RAT may include a UMTS terrestrial radio access network (UTRAN) and a GSM EDGE radio access network (GERAN) that follow a 3GPP standard specification and may also include a CDMA 2000 system that follows a 3GPP2 standard specification.

Figure 9:
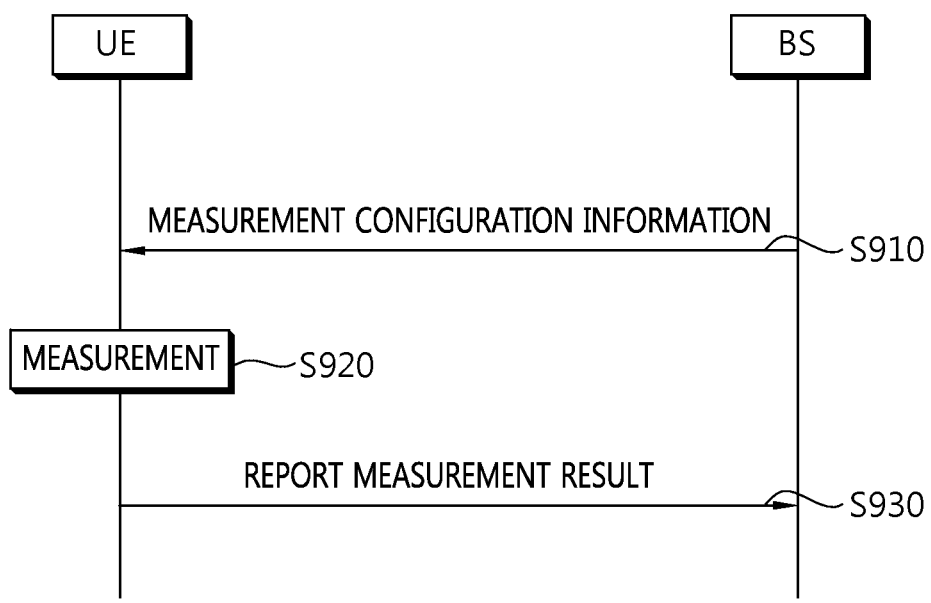
FIG. 9 is a flowchart illustrating a method for performing measurement in the related art.

FIG. 9 is a flowchart illustrating a method for performing measurement in the related art.

The UE receives measurement configuration information from the base station (S910). A message including the measurement configuration information is called a measurement configuration message. The terminal performs the measurement based on the measurement configuration information (S920). The terminal reports the measurement result to the base station when the measurement result satisfies a reporting condition in the measurement configuration information (S930). A message including the measurement result is called a measurement reporting message.

The measurement configuration information may include the following information.

(1) Measurement object information: The measurement object information is information on an object for which the terminal is to perform the measurement. A measurement object may include at least one of an intra-frequency measurement object which is an object of intra-cell measurement, an inter-frequency measurement object which is an object of inter-cell measurement, and an inter-RAT measurement object which is an object of inter-RAT measurement. For example, the intra-frequency measurement object may indicate the neighbor cell having the same frequency band as the serving cell, the inter-frequency measurement object may indicate the neighboring cell having the different frequency band from the serving cell, and the inter-RAT measurement object may indicate a neighbor cell of RAT different from the RAT of the serving cell.

(2) Reporting configuration information: The reporting configuration information is information on a report condition and a report type regarding the time when the terminal reports the measurement result. The reporting configuration information may be constituted by a list of reporting configurations. Each reporting configuration may include a reporting criterion and a reporting format. The reporting criterion is a criterion to trigger the terminal's triggering the measurement result. The reporting criterion may be a period of the measurement reporting or a single event for the measurement reporting. The reporting format is information regarding which type the terminal configures of the measurement result.

(3) Measurement identity information: The measurement identity information is information regarding a measurement identity that determines a measurement object, a reporting time, and a reporting type by the terminal by associating the measurement target and the reporting configuration with each other. The measurement identity information is included in the measurement reporting message to represent which measurement object the measurement result is for and which reporting condition the measurement reporting is performed in.

(4) Quantity configuration information: The quantity configuration information is information on a parameter for configuring filtering of a measurement unit, a reporting unit, and/or a measurement result value.

(5) Measurement gap information: The measurement gap information is information on a measurement gap which is an interval which the terminal may use for only measurement without considering data transportation with the serving cell because downlink transportation or uplink transportation is not scheduled.

The terminal has a measurement object list, a measurement reporting configuration list, and a measurement identity list in order to perform a measurement procedure.

In the 3GPP LTE, the base station may configure only one measurement object for one frequency band to the terminal. According to Clause 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger the measurement reporting shown in the following table are defined.

TABLE 2

| Event | Reporting condition |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result of the terminal satisfies the configured event, the UE transports the measurement reporting message to the base station.

Figure 10:
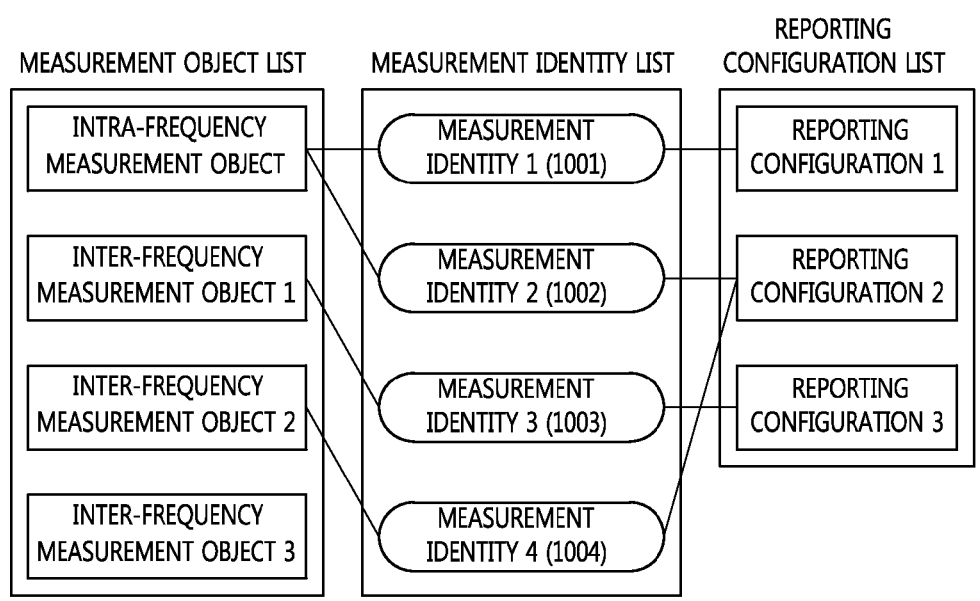
FIG. 10 illustrates one example of a measurement configuration which is configured to the terminal.

FIG. 10 illustrates one example of a measurement configuration which is configured to the terminal.

First, measurement identity 1 1001 connects an intra-frequency measurement object and reporting configuration 1. The terminal performs intra frequency measurement and the reporting configuration 1 is used to determine a criterion and a reporting type of reporting the measurement result.

Measurement identity 2 1002 is connected with the intra-frequency measurement object similarly as the measurement identity 1 1001, but the intra-frequency measurement object is reporting configuration 2. The terminal performs measurement and the reporting configuration 2 is used to determine the criterion and the reporting type of reporting the measurement result.

By the measurement identity 1 1001 and the measurement identity 2 1002, the terminal transports the measurement result even though the measurement result for the intra-frequency measurement object satisfies any one of the reporting configuration 1 and the reporting configuration 2.

Measurement identity 3 1003 connects inter-frequency measurement object 1 and reporting configuration 3. When a measurement result for the inter-frequency measurement object 1 satisfies a reporting condition included in the reporting configuration 1, the terminal reports the measurement result.

Measurement identity 4 904 connects the inter-frequency measurement object 2 and the reporting configuration 2. When a measurement result for the inter-frequency measurement object 2 satisfies a reporting condition included in the reporting configuration 2, the terminal reports the measurement result.

Meanwhile, the measurement object, the reporting configuration, and/or the measurement identity may be added, changed, and/or deleted. These may be instructed when the base station sends a new measurement configuration message or a measurement configuration change message to the terminal.

Figure 11:
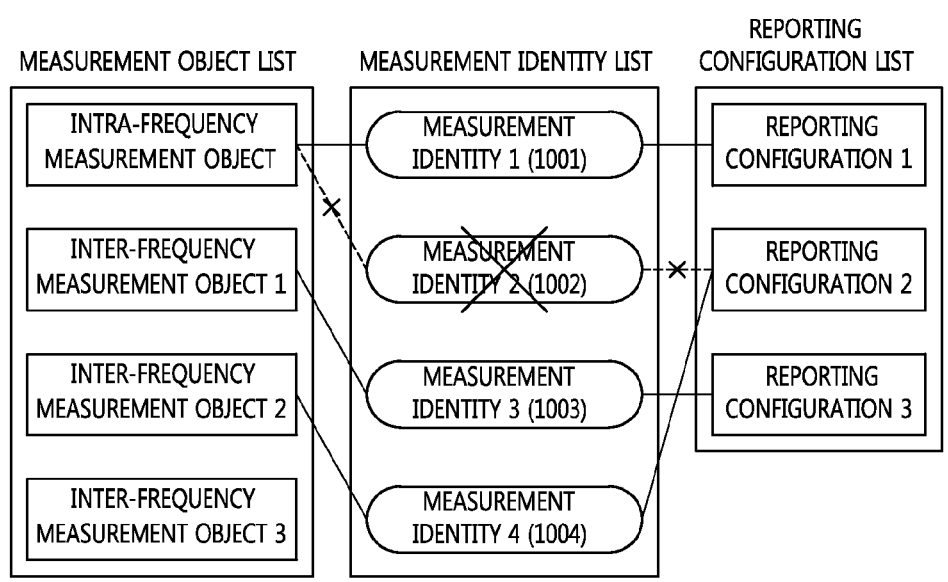
FIG. 11 illustrates an example of deleting the measurement identity.

FIG. 11 illustrates an example of deleting the measurement identity. When the measurement identity 2 1002 is deleted, measurement for a measurement object associated with the measurement identity 2 1002 is stopped and a measurement report is not also transported. A measurement object or a reporting configuration associated with the deleted measurement identity may not be changed.

Figure 12:
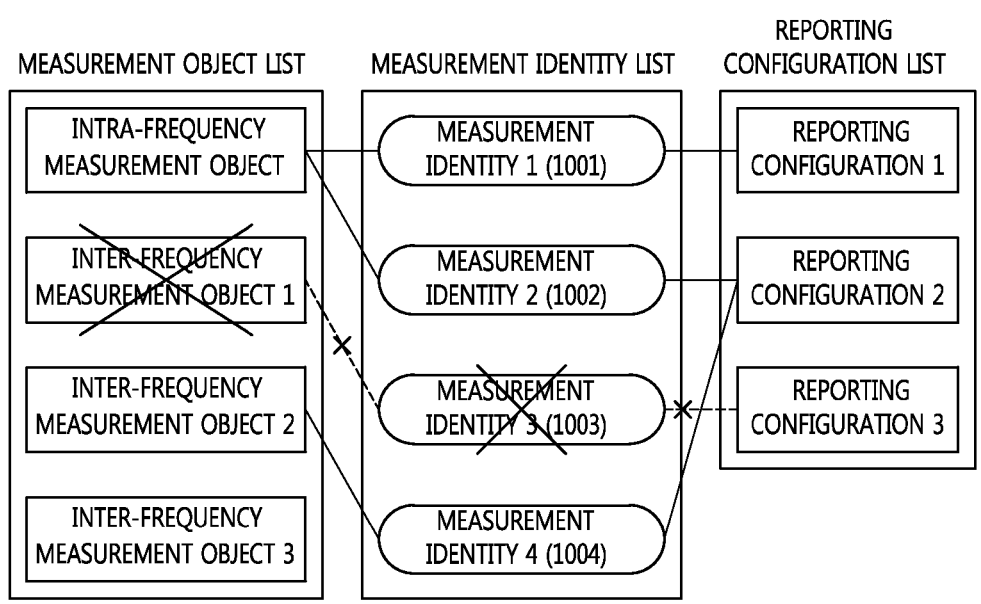
FIG. 12 illustrates an example of deleting the measurement object.

FIG. 12 illustrates an example of deleting the measurement object. When the inter-frequency measurement object 1 is deleted, the terminal deletes even the measurement identity 3 1003 associated therewith. Measurement for the inter-frequency measurement object 1 is stopped and a measurement report is not also transported. However, a reporting configuration associated with the deleted inter-frequency measurement object 1 may not be changed or deleted.

When the reporting configuration is removed, the terminal removes even a measurement identity associated therewith. The terminal stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

Subsequently, scaling of a mobility related parameter that influences deciding whether a terminal moves according to a terminal mobility state will be described. When the terminal passes through cells at a high speed, the terminal does not move to neighboring cells at a proper time, and as a result, the terminal may be in a service disabling state. Accordingly, when a value of the mobility related parameter is optimized to the speed of the terminal according to the speed of the terminal, performance of movement by the terminal increases. The terminal estimates the mobility state (mobility state estimation (MSE)) and a parameter related with mobility decision is scaled according to the estimated mobility state of the terminal, movement of the terminal may be more efficiently supported.

The mobility state of the terminal decided by the MSE may be divided into a high mobility state, a medium mobility state, and a normal mobility state. The respective mobility states may be decided based on the number of times when the handover by the terminal is performed and/or the number of times when the cell reselection is performed.

A terminal that is in an RRC idle state performs the cell reselection when a cell reselection condition is satisfied. When the number of times at which the terminal performs the cell reselection for a specific time interval $T_{CRmax}$ is more than a first threshold value $N_{CR\_H}$, a condition of the high mobility state is satisfied as the mobility state of the terminal. When the number of times at which the terminal performs the cell reselection for $T_{CRmax}$ is more than $N_{CR\_M}$ which is a second threshold value and not more than $N_{CR\_H}$ which is the first threshold value, a condition of the medium mobility state is satisfied as the mobility state of the terminal. When the number of times when the terminal performs the cell reselection for the specific time interval $T_{CRmax}$ is not more than a second threshold value $N_{CR\_M}$, a condition of the normal mobility state is satisfied as the mobility state of the terminal. However, when the terminal performs the cell reselection consecutively between two same cells, the cell reselection may not be counted as the number of cell reselection times.

The terminal in the RRC connection state reports a measurement result and performs the handover when measuring the neighboring cell. When the number of times at which the terminal performs the cell reselection for the specific time interval is more than the first threshold value, a condition of the high mobility state is satisfied as the mobility state of the terminal. Meanwhile, when the number of times at which the terminal performs the handover for the specific time interval is more than the second threshold value and not more than the first threshold value, a condition of the medium mobility state is satisfied as the mobility state of the terminal. When the number of times when the terminal performs the cell reselection for the specific time interval is not more than second threshold value, a condition of the normal mobility state is satisfied as the mobility state of the terminal.

The terminal in the RRC idle or RRC connection state senses that the condition of the mobility state is satisfied, the terminal may enter the corresponding mobility state. Entering the corresponding mobility state may indicate that the terminal determines that the mobility state thereof is the corresponding mobility state. However, when it is determined that both the high mobility state condition and the medium mobility state condition are not satisfied for the specific time interval, the terminal may enter the normal mobility state.

The terminal that determines the mobility state may scale the mobility parameter based on the mobility state. The terminal in the RRC idle state may scale a Treselection parameter and the terminal in the RRC connection state may scale a TimeToTrigger parameter. The scaling may be implemented by multiplying the Treselection parameter or the TimeToTrigger parameter by a specific scaling factor. The scaling factor may vary depending on the mobility state of the terminal. For example, the scaling factor in the high mobility state may be smaller than that in the medium mobility state. In the normal mobility state, the scaling may not be performed. The scaling may be performed by the network or the cell as well as the terminal and information thereon may be given to the terminal.

First, the scaling applied to the Treselection parameter which the terminal in the RRC idle state uses for the cell reselection will be describe in detail.

1) In the case of the normal mobility state (in the case of not the medium/high mobility state)
Treselection is not scaled.
2) In the case of the high mobility state
In the E-UTRAN, $Treselection_{EUTRA}$ is multiplied by the scaling factor sf-high to be scaled.
In the UTRAN, $Treselection_{UTRA}$ is multiplied by the scaling factor sf-high to be scaled.
In the GERAN, $Treselection_{GERA}$ is multiplied by the scaling factor sf-high to be scaled.
In CDMA2000 HRPD, $Treselection_{CDMA\_HRPD}$ is multiplied by the scaling factor sf-high to be scaled.
In CDMA2000 1×RTT, $Treselection_{CDMA\_1\times RTT}$ is multiplied by the scaling factor sf-high to be scaled.

3) In the case of the medium mobility state
In the E-UTRAN, $Treselection_{EUTRA}$ is multiplied by the scaling factor sf-medium to be scaled.
In the UTRAN, $Treselection_{UTRA}$ is multiplied by the scaling factor sf-medium to be scaled.
In the GERAN, $Treselection_{GERA}$ is multiplied by the scaling factor sf-medium to be scaled.
In CDMA2000 HRPD, $Treselection_{CDMA\_HRPD}$ is multiplied by the scaling factor sf-medium to be scaled.
In CDMA2000 1×RTT, $Treselection_{CDMA\_1\times RTT}$ is multiplied by the scaling factor sf-medium to be scaled.

An information parameter (e.g., scaling factor) required for the Treselection parameter scaling by the terminal in the RRC idle state may be provided to the terminal while being included in the broadcasted system information. The terminal may perform the scaling when the information parameter for the scaling is included in the system information.

Next, the scaling applied to the TimeToTrigger parameter which the terminal in the RRC connection state uses for the measurement reporting and/or the handover will be describe in detail.

1) In the case of the normal mobility state (in the case of not the medium/high mobility state)
TimeToTrigger is not scaled.
2) In the case of the high mobility state
TimeToTrigger is multiplied by the scaling factor sf-high to be scaled.
3) In the case of the medium mobility state
TimeToTrigger is multiplied by the scaling factor sf-medium to be scaled.

As such, when the scaled mobility parameter is applied differently according to the mobility state of the terminal, more appropriate movement execution may be enabled. For example, when the terminal in the RRC idle state moves at the high speed, the terminal may perform the cell reselection to the target cell rapidly by deciding whether the condition for executing the cell reselection is satisfied within a shorter time. Further, when the terminal in the RRC connection state moves at the high speed, the terminal determines whether the measurement result reporting condition is satisfied for a specific time within the shorter time and reports whether the condition is satisfied to perform the handover to the target cell more rapidly.

Like the mobility state estimated through the aforementioned MSE, the mobility state of the terminal may be implemented in various types. The mobility state of the terminal may be expressed by an actual speed of the terminal. Further, the mobility state of the terminal may be expressed by the number of cell movement (cell reselection and/or handover) times of the terminal, which is counted for the MSE itself.

Hereinafter, interworking between the 3GPP based access network and another access network will be described.

In the 3GPP, access network discovery and selection functions (ANDSF) for discovering and selecting an accessible access network while introducing interworking with a non-3GPP access network (e.g., WLAN) from Rel-8 is standardized. The ANDSF may transfer access network discovery information (e.g., WLAN, WiMAX positional information, and the like) which is accessible at a location of the terminal, inter-system mobility policies (ISMP) to reflect a policy of a provider, and an inter-system routing policy (ISRP) and the terminal may determine IP traffic to be transmitted and an access network to be passed through based on the information. The ISMP may include a network selection rule regarding that the terminal selects one active access network connection (for example, the WLAN or 3GPP). The ISRP may include a network selection rule regarding that the terminal selects one or more potential active access network connections (for example, both WLAN and 3GPP). The inter-system routing policy includes multiple access PDN connectivity (MAPCON), IP flow mobility (IFOM), and non-seamless WLAN offloading. Open mobile alliance device management, or the like is used for dynamic provision between the ANDSF and the terminal.

The MAPCON is configured by standardizing a technology that configures and maintains simultaneous multiple PDN connectivity via the 3GPP access network and the non-3GPP access network and enables seamless traffic offloading whole active PDN connection unit seamless traffic offloading. To this end, the ANDSF server provides information on an access point name (APN) that will perform the offloading, the priority (routing rule) between the access networks, the time (time of day) to which the offloading method is applied, and the information on the access network (validity area) to be offloaded.

The IFOM supports more flexible and subdivided IP flow mobility and seamless offloading than the MAPCON. A technical feature of the IFOM enables, even though the terminal is connected to a packet data network by using the same access point name (APN), the terminal to access the packet data network through different access networks unlike the MAPCON and enables the units of the mobility and the offloading to move by the unit of the packet data network but a specific service IP traffic flow, to be flexible in providing the service. To this end, an ANDSF server provides information on an IP flow that will perform offloading, a priority (routing rule) between the access networks, a time (time of day) to which an offloading method is applied, and information on an access network (validity area) to be offloaded.

Non-seamless WLAN offloading represents a technology that does not switch a path of predetermined specific IP traffic to the WLAN but completely offloads traffic so as not to pass through an EPC. Since this is not anchored to a P-GW for supporting the mobility, the offloaded IP traffic may not seamlessly move to the 3GPP access network again. To this end, the ANDSF server provides information similar to information provided to perform the IFOM to the terminal.

Figure 13:
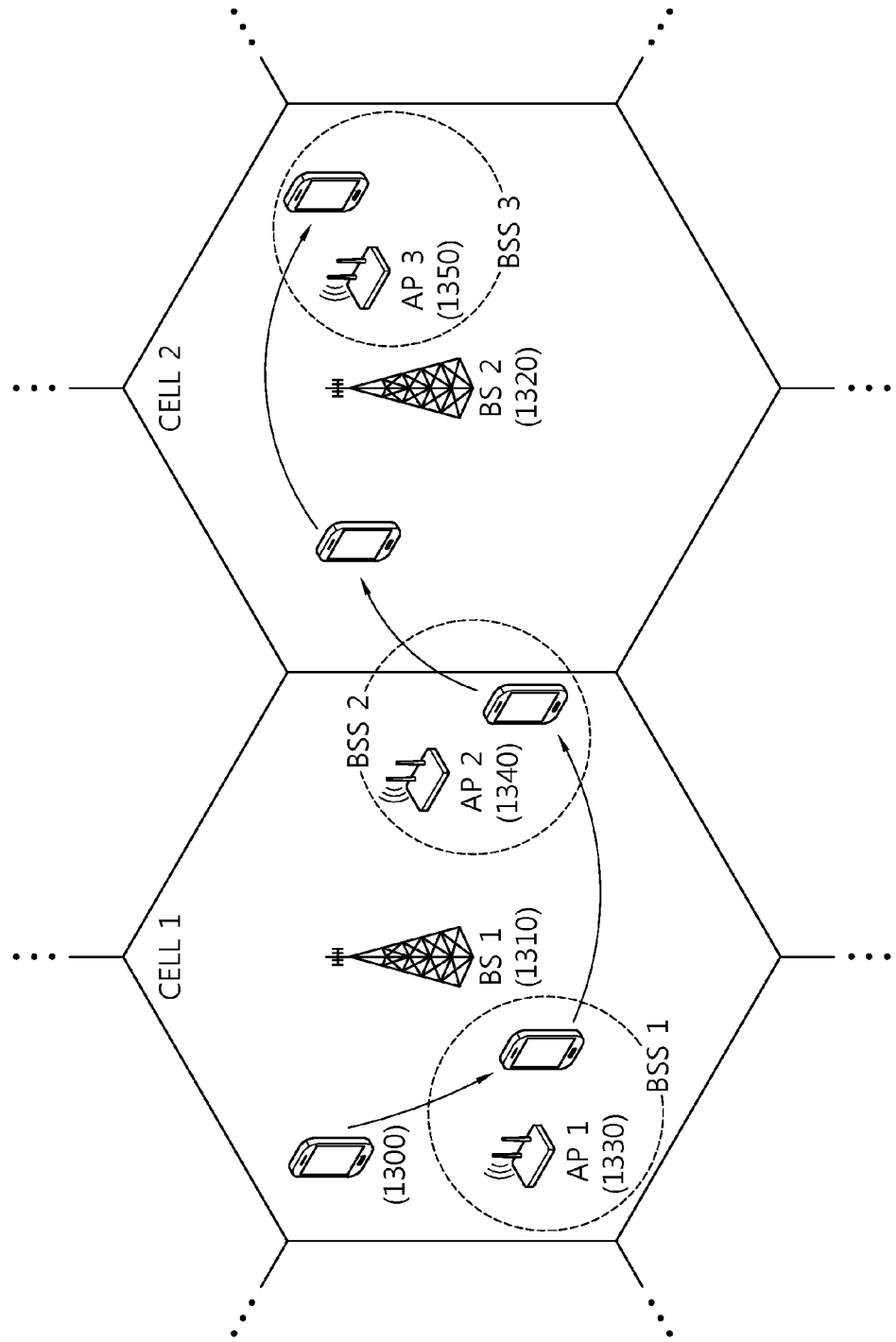
FIG. 13 is a diagram illustrating an example of an environment in which the 3GPP access network and the WLAN access network coexist.

FIG. 13 is a diagram illustrating an example of an environment in which the 3GPP access network and the WLAN access network coexist.

Referring to FIG. 13, as the 3GPP access network, cell 1 in which base station 1 1310 is centered and cell 2 in which base station 2 1320 is centered are extended. Further, as the WLAN access network, basic service set (BSS) 1 in which an access point (AP) 1 1330 positioned in the cell 1 is centered and BSS2 in which an AP2 1340 is centered are extended and BSS3 in which AP3 1350 that exists in cell 2 is centered is extended. Coverage of the cell is illustrated by a solid line and coverage of the BSS is illustrated by dotted lines.

It is assumed that a terminal 1300 is configured to perform communication through the 3GPP access network and the WLAN access network. In this case, the terminal 1300 may be called a station.

Initially, the terminal 1300 establishes connection with the BS1 1310 in the cell 1 to perform traffic processing through the 3GPP access network.

The terminal 1300 may enter coverage of the BSS1 while moving in coverage of cell 1 and discover the BSS1 through scanning. In this case, the terminal 1300 may be connected with the WLAN access network by performing association and authentication procedures with the AP1 1330 of the BSS1. As a result, the terminal 1300 may process the traffic through the 3GPP access network and the WLAN access network. Meanwhile, when the terminal 1300 moves to deviate from the coverage of the BSS1, connection with the WLAN access network may end.

The terminal 1300 continuously moves in the coverage of the cell 1 to move to the vicinity of a boundary between the cell 1 and the cell 2 and enters the coverage of the BSS2 to discover the BSS2 through scanning. In this case, the terminal 1300 may be connected with the WLAN access network by performing the association and authentication procedures with the AP2 1340 of the BSS2. Meanwhile, since the terminal 900 in the coverage of the BSS2 is positioned on the boundary of the cell 1 and the cell 2, service quality through the 3GPP access network may not be excellent. In this case, the terminal 1300 may operate to concentratively process the traffic through the WLAN access network.

When the terminal 1300 moves to deviate from the coverage of the BSS2 and enters the center of the cell 2, the terminal 1300 may terminate the connection with the WLAN access network and process the traffic through the 3GPP access network based on the cell 2.

The terminal 1300 may enter the coverage of the BSS3 while moving in the coverage of cell 2 and discover the BSS1 through scanning. In this case, the terminal 1300 may be connected with the WLAN access network by performing the association and authentication procedures with the AP3 1350 of the BSS3. As a result, the terminal 1300 may process the traffic through the 3GPP access network and the WLAN access network.

As described in the example of FIG. 13, under a wireless communication environment in which the 3GPP access network and the non-3GPP access network coexist, the terminal may adaptively process the traffic through the 3GPP access network and/or the non-3GPP access network.

The terminal needs to determine the non-3GPP access network positioned therearound in order to efficiently offload some or all traffic being transmitted/received or to be transmitted/received in the 3GPP access network to the non-3GPP access network. Service the coverage of the non-3GPP access network such as the WLAN access network may be still smaller than the macro cell coverage of the 3GPP access network. Therefore, the terminal needs to continuously activate the module for the non-3GPP communication and perform detection in order to discover the non-3GPP access network and effectively offload the traffic by using the discovered non-3GPP access network. However, this can rapidly consume the power of the terminal. In order to prevent the rapid consumption of the power, the terminal needs to intermittently perform detecting the non-3GPP access network.

The terminal that moves at the high speed may rapidly pass through a service area of the non-3GPP access network. Therefore, the terminal that moves at the high speed needs to more rapidly discover the non-3GPP access network and process the traffic in order to offload the traffic to the non-3GPP access network. To this end, the present invention proposes a scheme considering the mobility of the terminal in the traffic processing through the non-3GPP access network.

Figure 14:
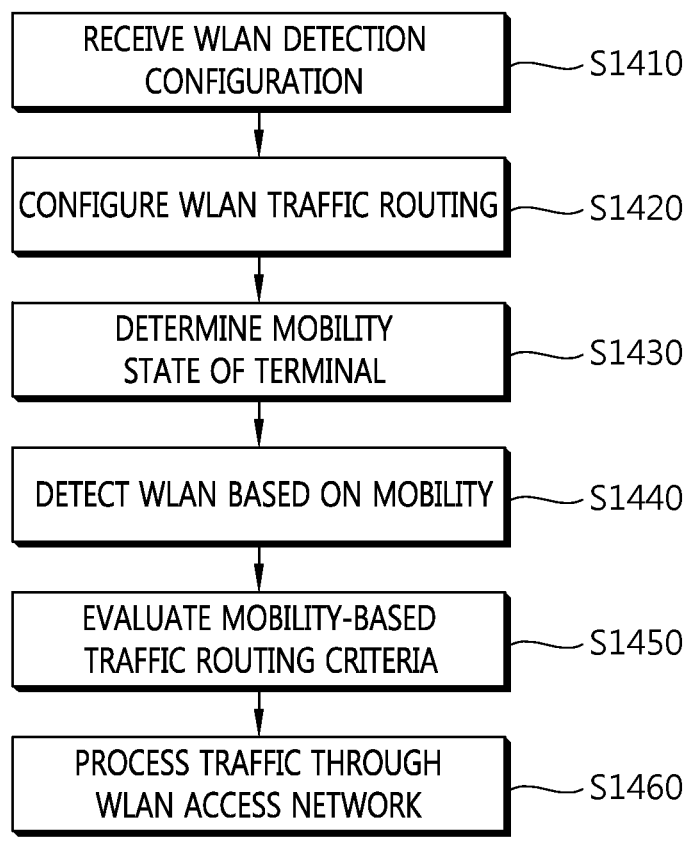
FIG. 14 is a diagram illustrating a method for moving according to an embodiment of the present invention.

FIG. 14 is a diagram illustrating a method for communicating according to an embodiment of the present invention.

Referring to FIG. 14, the terminal receives a WLAN detection configuration (S1410). The WLAN detection configuration includes information for scheduling a WLAN detecting operation of the terminal. The terminal may activate a WLAN communication function based on the WLAN detection configuration and search the WLAN access network.

The WLAN detection configuration may include information for WLAN search scheduling according to the mobility state of the terminal. The WLAN detection configuration for this may be implemented as follows.

1) Detection Parameter Set According to Mobility State of Terminal

The WLAN detection configuration may include one or more detection parameter sets corresponding to the mobility state of the terminal. In this case, the terminal may perform the WLAN detection according to different detection parameter sets for each mobility state. The WLAN detection configuration including one or more detection parameter sets may be implemented as shown in Table 3 given below.

TABLE 3

| Related terminal mobility | Detection parameter set | Application |
| --- | --- | --- |
| Mobility state 1 | Detection parameter set 1 = {Parameter $1_1$, Parameter $2_1$, . . . , Parameter $K_1$} | Applied by termianl in mobility state 1 |
| Mobility state 2 | Detection parameter set 1 = {Parameter $1_2$, Parameter $2_2$, . . . Parameter $K_1$} | Applied by termianl in mobility state 2 |
| . . . | . . . | . . . |
| Mobility state N | Detection parameter set 1 = {Parameter $1_N$, Parameter $2_N$, . . . Parameter $K_N$} | Applied by termianl in mobility state N |

A detection parameter set related with the mobility state of the terminal that moves at the high speed may include detection parameters configured for rapid and frequent WLAN detection execution scheduling of the terminal. For example, when it is assumed that a terminal in mobility state 1 is higher in movement speed than a terminal in mobility state 2, detection parameters may be configured so that WLAN detection by detection parameters of detection parameter set 2 is more frequently performed than WLAN detection scheduled by detection parameters of detection parameter set 1.

For example, in the WLAN detection configuration which may be implemented as shown in Table 3 given above, each detection parameter set may include at least one of the following detection parameters.

Maximum detection interval parameter P1: A maximum detection interval specifies a maximum time interval when the terminal may not perform the WLAN detection. When a time indicated by the maximum detection interval parameter elapses from the time of terminating the WLAN detection, the terminal needs to start the WLAN detection. Meanwhile, even before the time indicated by the maximum detection interval parameter elapses, the operation of the terminal that performs the WLAN detection may be permitted.

Detection cycle parameter P2: The detection cycle parameter indicates a detection cycle at which the terminal is required to perform the WLAN detection at least once. The terminal may start the WLAN detection according to the cycle indicated by the detection cycle parameter.

Detection period parameter P3: The detection period parameter indicates a time period during the terminal that starts the WLAN detection maintains the WLAN detection operation.

The detection parameter set may include P1 and/or P2 and additionally include P3. Therefore, operation scheduling for the WLAN detection of a terminal in a specific mobility state may be achieved.

A detection parameter set related with the rapid movement may include P1 and/or P2 which is configured as a shorter value. Therefore, the terminal may more frequently perform the WLAN detection. Further, the detection parameter set related with the rapid movement may include P3 which is configured as a longer value. Therefore, the terminal may perform the WLAN detection for a longer time.

2) Detection Parameter Set and Scaling Parameter Set According to Mobility State of Terminal The WLAN detection configuration may include one or more detection parameter sets which are commonly applied regardless of the mobility of the terminal and one or more scaling parameter sets corresponding to the mobility state of the terminal. In this case, the terminal applies the related scaling parameter in the scaling parameter set according to the mobility state of the terminal to the detection parameter in the detection parameter set to perform the WLAN detection according to the decided WLAN detection scheduling. The resulting WLAN detection configuration may be implemented as shown in Table 4 given below.

TABLE 4

| Related terminal mobility | Parameter | | Application |
| --- | --- | --- | --- |
| Mobility state 1 | Detection parameter set = {Parameter 1, Parameter 2, . . . , Parameter K} | Scaling parameter set 1 = {Parameter $1_1$, Parameter $2_1$, . . . , Parameter $K_1$} | Specific scaling parameter of scaling parameter set 1 is applied to related detection parameter by terminal in mobility state 1 |
| Mobility state 2 | | Scaling parameter set 2 = {Parameter $1_2$, Parameter $2_2$, . . . , Parameter $K_2$} | Specific scaling parameter of scaling parameter set 2 is applied to related detection parameter by terminal in mobility state 2 |
| . . . | | . . . | . . . |
| Mobility state N | | Scaling parameter set N = {Parameter $1_N$, Parameter $2_N$, . . . , Parameter $K_N$} | Specific scaling parameter of scaling parameter set N is applied to related detection parameter by terminal in mobility state N |

A scaling parameter set related with the mobility state of the terminal that moves at the high speed may include scaling parameters configured for rapid and frequent WLAN detection execution scheduling of the terminal. For example, when it is assumed that the terminal in mobility state 1 is considered to be higher in movement speed than the terminal in mobility state 2, scaling parameters may be configured so that WLAN detection scheduled when the scaling parameters of the scaling parameter set 2 are applied to the detection parameters is more frequently performed than WLAN detection scheduled when the scaling parameters of the scaling parameter set 1 are applied to the detection parameters.

For example, in the WLAN detection configuration which may be implemented as shown in Table 4 given above, the detection parameter set may include at least one of the following detection parameters.

Detection cycle parameter P1: The detection cycle parameter indicates a detection cycle at which the terminal is required to perform the WLAN detection at least once. The terminal may start the WLAN detection according to the cycle indicated by the detection cycle parameter.

Maximum detection interval parameter P2: A maximum detection interval specifies a maximum time interval when the terminal may not perform the WLAN detection. When a time indicated by the maximum detection interval parameter elapses from the time of terminating the WLAN detection, the terminal needs to start the WLAN detection. Meanwhile, even before the time indicated by the maximum detection interval parameter elapses, the operation of the terminal that performs the WLAN detection may be permitted.

Detection period parameter P3: The detection period parameter indicates a time period during the terminal that starts the WLAN detection maintains the WLAN detection operation.

The detection parameter set may include P1 and/or P2 and additionally include P3.

Further, each scaling parameter set may include scaling parameters corresponding to a mobility state K of the terminal. When the detection parameter set includes all of P1, P2, and P3, each scaling parameter set may include a scaling parameter $SF1_K$, a scaling parameter $SF2_K$ applied to P2, and a scaling parameter $SF3_K$ applied to P3. The terminal may apply the scaling parameter included in the scaling parameter set according to the mobility state to the detection parameter and perform the WLAN detection based thereon.

In an example of multiplying the detection parameter by the scaling parameter, SF1 and SF2 may be set to values which are more than 0 and equal to or less than 1. SF1 and SF2 included in the scaling parameter set related with the rapid movement may be set to smaller values. Therefore, the terminal may more frequently perform the WLAN detection. On the contrary, in the example of multiplying the detection parameter by the scaling parameter, SF3 may be set to a value more than 1. Therefore, SF3 included in the scaling parameter set related with the rapid movement may be set to larger values. Therefore, the terminal may perform the WLAN detection for a longer time.

Figure 15:
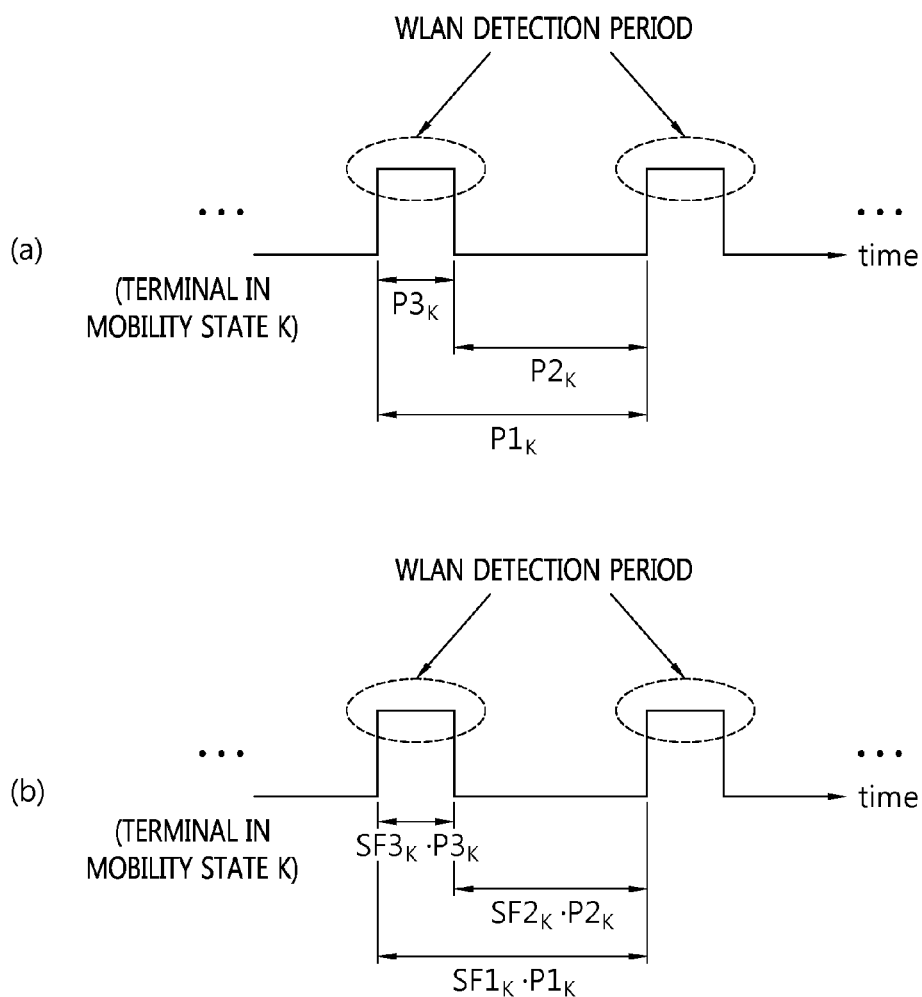
FIG. 15 illustrates an example of the WLAN detection operation scheduling of the terminal according to the WLAN detection configuration.

Subfigure (b) of FIG. 15 illustrates an example of the WLAN detection operation scheduling of the terminal according to the WLAN detection configuration.

One or more detection parameter sets and/or one or more scaling parameter sets included in the WLAN detection configuration may be implemented according to how the mobility state of the terminal considered for the WLAN detection configuration is subdivided. For example, when one or more detection parameter sets and/or one or more scaling parameter sets are implemented according to the mobility state of the terminal by the MSE, the WLAN detection configuration may include three detection parameter sets and/or three scaling parameter sets. As another example, when the mobility state of the terminal is further subdivided into speed periods of the terminal, the WLAN detection configuration may include detection parameter sets and/or scaling parameter sets as many as the mobility states subdivided into the terminal speed periods.

The WLAN detection configuration may include information related with the terminal mobility state considered for the WLAN detection scheduling. That is, the WLAN detection configuration may include information regarding how the mobility state considered in the WLAN detection configuration is subdivided. For example, the WLAN detection configuration may include indicating that the mobility state by the MSE is considered. As another example, the WLAN detection configuration may include information indicating the mobility state for each speed period of the terminal.

Referring back to FIG. 14, the terminal receives the WLAN traffic routing configuration from the 3GPP access network (S1420). The WLAN traffic routing configuration may specify a traffic routing criterion for deciding whether the 3GPP traffic is permitted to be offloaded to the WLAN access network.

The traffic routing criterion may indicate a condition in which the traffic routing is permitted based on the mobility state of the terminal. An example of the traffic routing criterion will be described below.

1) The traffic routing criterion may indicate a condition in which the traffic routing is permitted when the mobility state of the terminal is a specific mobility state.

The specific mobility state may be the normal mobility state.

The specific mobility state may be the normal mobility state and the medium mobility state.

2) The traffic routing criterion may indicate a condition in which the routing is permitted when an actual speed of the terminal is equal to or less than a specific threshold speed. In this case, the threshold speed may be provided to the terminal together with the traffic routing criterion or previously configured in the terminal.

3) The traffic routing criterion may indicate the condition in which the traffic routing is permitted when the terminal is in a stationary state.

The stationary state may mean that a physical speed of the terminal is 0.

The stationary state may mean that the mobility state by the MSE is the normal mobility state.

The traffic routing criterion may indicate a condition in which the traffic routing is not permitted based on the mobility state of the terminal. An example of the traffic routing criterion will be described below.

1) The traffic routing criterion may indicate a condition in which the traffic routing is not permitted when the mobility state of the terminal is a specific mobility state.

The specific mobility state may be the medium mobility state and the high mobility state (that is, the mobility state of the terminal is not the normal mobility state).

The specific mobility state may be the high mobility state (that is, the mobility state of the terminal is not the normal mobility state and the medium mobility state).

2) The traffic routing criterion may indicate a condition in which the routing is not permitted when the actual speed of the terminal is equal to or more than the specific threshold speed. In this case, the threshold speed may be provided to the terminal together with the traffic routing criterion or previously configured in the terminal.

3) The traffic routing criterion may indicate a condition in which the traffic routing is permitted when the terminal is in a non-stationary state.

The non-stationary state may mean that the physical speed of the terminal is not 0.

The non-stationary state may mean that the mobility state by the MSE is the medium mobility state and the high mobility state (that is, means that the mobility state of the terminal is not the normal mobility state).

The terminal decides the mobility state (S1430).

The terminal's deciding the mobility state may be the terminal's estimating which state of the normal mobility state, the medium mobility state, and the high mobility state the terminal is in based on the aforementioned MSE.

The terminal's deciding the mobility state may be the terminal's estimating which state of the normal mobility state, the medium mobility state, and the high mobility state the terminal is in according to the actual speed of the terminal. To this end, a criterion related with the mobility state for each speed period may be provided to the terminal.

The terminal's deciding the mobility state may be acquiring the actual speed value of the terminal.

The terminal may decide the mobility state of the terminal which is continuously changed.

The terminal performs mobility based WLAN detection (S1440).

The terminal may perform the WLAN detection based on a detection parameter set corresponding to a current terminal mobility state among one or more detection parameter sets included in the WLAN detection configuration information. The terminal may activate the WLAN communication function and perform scanning during the detection period scheduled by the detection parameter.

Alternatively, the terminal may apply a scaling parameter set corresponding to the current terminal mobility state among one or more scaling parameter sets included in the WLAN detection configuration information to the detection parameter set and perform the WLAN detection based on the scaled detection parameters. The terminal may activate the WLAN communication function and perform the scanning during the detection period scheduled by the scaled detection parameter.

The WLAN detection of the terminal may be performed according to passive scanning and/or active scanning defined in the WLAN.

According to the passive scanning, the terminal may discover the WLAN access network entity through receiving a beacon frame transmitted from the WLAN access network entity. The terminal may discover an AP and/or a non-AP station that transmits the beacon frame. All or some of the WLAN system information are included in the probe response frame transmitted from the AP and/or the non-AP station. In more detail, as the identification information for the WLAN access network entity for the corresponding AP and/or the non-AP station, the BSSID, the SSID, the HESSID, and the like may be included in the beacon frame. Further, the capability information which may be supported by the WLAN access network entity may be included in the beacon frame.

According to the active scanning, the terminal may transmit a probe request frame. The probe request frame may be transmitted in a broadcast scheme. The terminal may receive a probe response frame from a specific WLAN access network entity as a response to the probe request frame and discover the corresponding WLAN access network entity. The terminal may discover an AP and/or a non-AP station that transmits the probe response frame. Meanwhile, the terminal may transmit the probe request frame through at least one channel/frequency according to the channel/frequency priority defined in the WLAN service information. All or some of the WLAN system information are included in the probe response frame transmitted from the AP and/or the non-AP station. In more detail, as identification information for the WLAN access network entity for the corresponding AP and/or the non-AP station, the BSSID, the SSID, the HESSID, and the like may be included in the probe response frame. Further, capability information which may be supported by the WLAN access network entity may be included in the probe response frame.

The terminal that discovers the WLAN access network entity through the WLAN detection performs the traffic routing criterion evaluation (S1450). The terminal may determine whether the WLAN access network entity discovered according to the current mobility state satisfies the traffic routing criterion.

The terminal deciding that the discovered WLAN access network entity satisfies the traffic routing criterion processes the traffic through the corresponding WLAN access network entity (S1460). Processing the traffic through the WLAN access network may be processing some or all of the 3GPP traffic through the corresponding WLAN access network entity.

Figure 16:
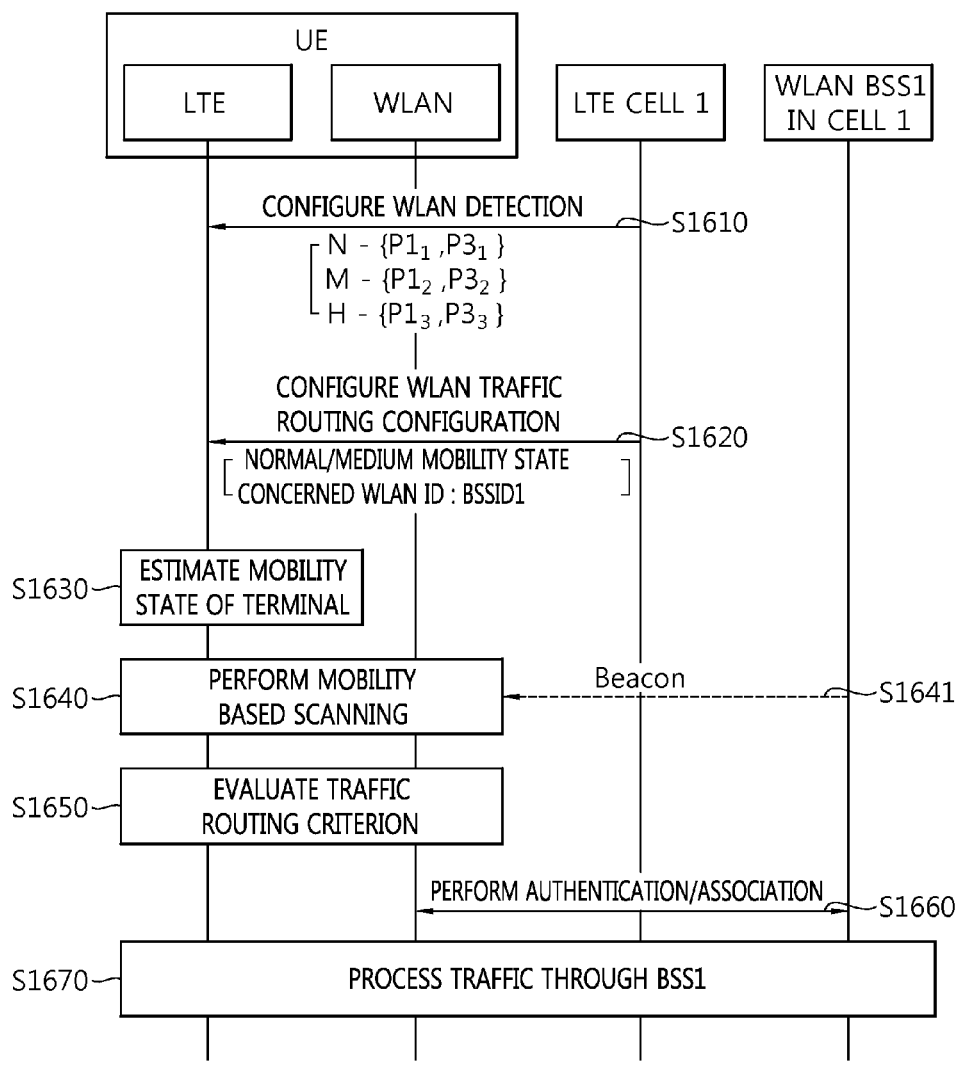
FIG. 16 is a diagram illustrating one example of a method for communicating according to an embodiment of the present invention.

FIG. 16 is a diagram illustrating one example of a method for communicating according to an embodiment of the present invention.

Figure 17:
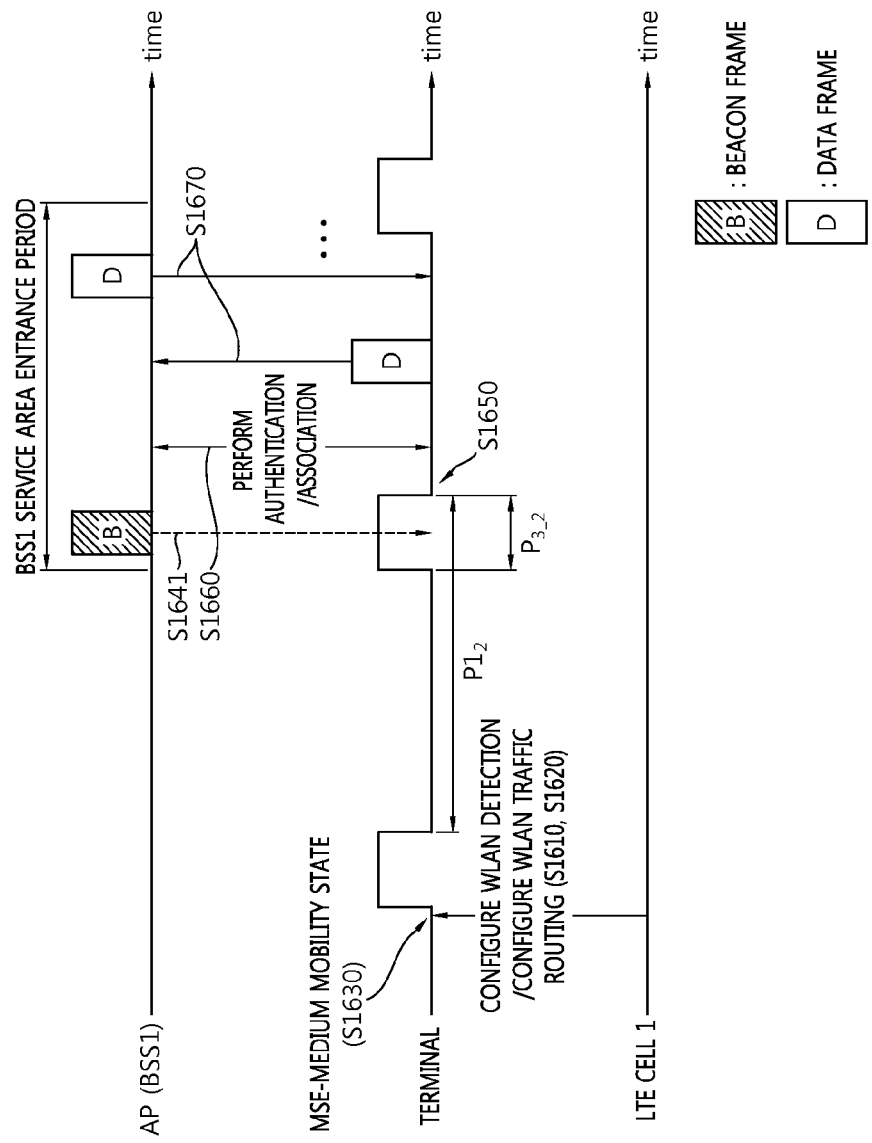
FIG. 17 is a diagram illustrating a process in which the communicating method according to the embodiment of the present invention illustrated in FIG. 16 is performed as time passed.

FIG. 17 is a diagram illustrating a process in which the communicating method according to the embodiment of the present invention illustrated in FIG. 16 is performed as time passed.

In the examples of FIGS. 16 and 17, it is assumed that the terminal supports both communication based on LTE and communication based on the WLAN and it is assumed that the LTE communication and the WLAN communication may be independently performed. It is assumed that the terminal camps on the cell 1 based on the LTE and/or the terminal receives the service by establishing the connection with the cell 1. It is assumed that the BSS1 is extended in the coverage of the cell 1.

The terminal receives the WLAN detection configuration from the cell 1 (S1610). The WLAN searching configuration includes information for scheduling a WLAN searching operation of the terminal. In this example, the WLAN detection configuration includes multiple detection parameter sets according to the mobility state of the terminal. The detection parameter set may correspond to the mobility state of the terminal by the MSE. When the terminal is in the normal mobility state, a first detection parameter may be applied and the first detection parameter set may include $P1_1$ and $P3_1$ as the detection parameters. When the terminal is in the medium mobility state, a second detection parameter may be applied and the second detection parameter set may include $P1_2$ and $P3_2$ as the detection parameters. When the terminal is in the high mobility state, a third detection parameter may be applied and the third detection parameter set may include $P1_3$ and $P3_3$ as the detection parameters.

The terminal receives the WLAN traffic routing configuration from the cell 1 (S1620). The WLAN traffic routing configuration specifies a traffic routing criterion for determining whether traffic routing through the WLAN access network entity discovered by the detection of the terminal is appropriate.

The traffic routing criterion by the WLAN traffic routing configuration may indicate that traffic processing through the WLAN access network is permitted when the terminal is in the normal mobility state or the medium mobility state.

Additionally, the traffic routing configuration may include a concerned WLAN list. The concerned WLAN list may include one or more concerned WLAN identities. The concerned WLAN may be a WLAN access network entity in which the traffic routing may be potentially permitted. The WLAN identifies included in the concerned WLAN list may be as follows.

WLAN SSID (Service Set Identity): The SSID may be duplicatively used in multiple BSSs.
  WLAN BSSID (Basic Service Set Identity): The BSSID as information for identifying a BSS managed by a specific AP may be generally configured as an MAC address of the corresponding AP.

HESSID (Homogeneous Extended Service Set Identity): The HESSID as the same value as one BSSID among APs and an identity set by a hotspot operator may be set in the form of the MAC address. All APs in a hotspot network may be set with the same HESSID value.

Domain name list: The domain name list may include one or more domain names of the WLAN access network entity.

The terminal decides the mobility state (S1630). The terminal's deciding the mobility state may be estimating whether the terminal is in the normal mobility state, the medium mobility state, or the high mobility state according to the MSE.

The terminal performs the scanning according to the mobility state for the WLAN detection (S1640). The terminal may select the detection parameter set related with the mobility state of the terminal among the detection parameter sets provided through the WLAN detection configuration and perform the scanning based on the detection parameter of the detection parameter set. For example, when it is decided that the mobility state of the terminal is the medium mobility state, the terminal may activate a WLAN transceiving function according to the $P1_2$ and $P3_2$ and perform the scanning.

The terminal may perform the passive scanning for the WLAN detection and the terminal receives the beacon frame transmitted from the AP of the BSS1 to discover the BSS1 (S1161). The BSSID of the BSS1 and the system information for operating the WLAN in the BSS1 may be included in the beacon frame.

The terminal performs the traffic routing criterion evaluation for the discovered BSS1 (S1650).

The terminal that receives the concerned WLAN list from the cell 1 may determine whether the BSS1 is the WLAN. Since the BSSID of the BSS1 is included in the concerned WLAN list, the terminal may decide that the BSS1 corresponds to the concerned WLAN.

The terminal may perform the traffic routing criterion evaluation according to the mobility state of the terminal. The WLAN traffic routing configuration includes information indicating that the traffic processing through the WLAN access network is enabled when the terminal is in the normal mobility state or the medium mobility state. Therefore, the terminal may decide that the BSS1 satisfies the traffic routing criterion when the mobility state estimated through step S1630 is the normal mobility state or the medium mobility state.

The terminal performs the association/authentication procedure to perform the WLAN communication in the BSS1 (S1660). The terminal transmits and receives the authentication frame to and from the AP of the BSS1 and exchanges the association request frame and the association response frame to perform the authentication and association procedures.

The terminal processes the traffic through the AP of the BSS1 (S1670). The terminal may process the traffic through the base station in the existing cell 1. The terminal associated with the AP may process the traffic on the 3GPP through exchanging the frame with the AP. What amount of traffic among all traffic to process through the WLAN access network may be adaptively decided according to the service environment in the cell 1 and the BSS1.

In the embodiment of the present invention described with reference to FIGS. 14 to 17, it is disclosed that the terminal performs both the mobility based WLAN detection and the mobility based traffic routing criterion evaluation, but the present invention is not limited thereto. In the communicating method according to the present invention, the terminal may consider the mobility state of the terminal during the WLAN detection and/or the traffic routing criterion evaluation.

The terminal may not consider the mobility state during the WLAN detection and consider the mobility state during the traffic routing criterion evaluation. As one example, when the WLAN detection configuration received by the terminal includes one detection parameter set or one scaling parameter set, the terminal may not consider the mobility state and perform the WLAN detection. In this case, a WLAN detection period of the terminal may be specified as a fixed time period regardless of the mobility state.

The terminal may consider the mobility state during the WLAN detection, but the terminal may not consider the mobility state during the traffic routing criterion evaluation. As one example, when the traffic routing criterion received by the terminal specifies the routing condition which is not related with the mobility state (e.g., when only the concerned WLAN list is provided), the terminal may evaluate the traffic routing criterion without considering the mobility state.

In the interworking between the 3GPP access network and the non-3GPP access network, the terminal may rapidly discover the non-3GPP access network and maximally use the discovered access network by adjusting the parameter for measuring the non-3GPP access network according to the mobility state of the terminal. Therefore, the operator can effectively control the load of the 3GPP access network. Further, under a situation in which traffic cannot be effectively offloaded to a small cell because a speed of the terminal is too high, the terminal finds the small cell such as the WLAN and does not perform the procedure for processing the traffic in the corresponding cell to prevent unnecessary battery consumption due to the operation.

Figure 18:
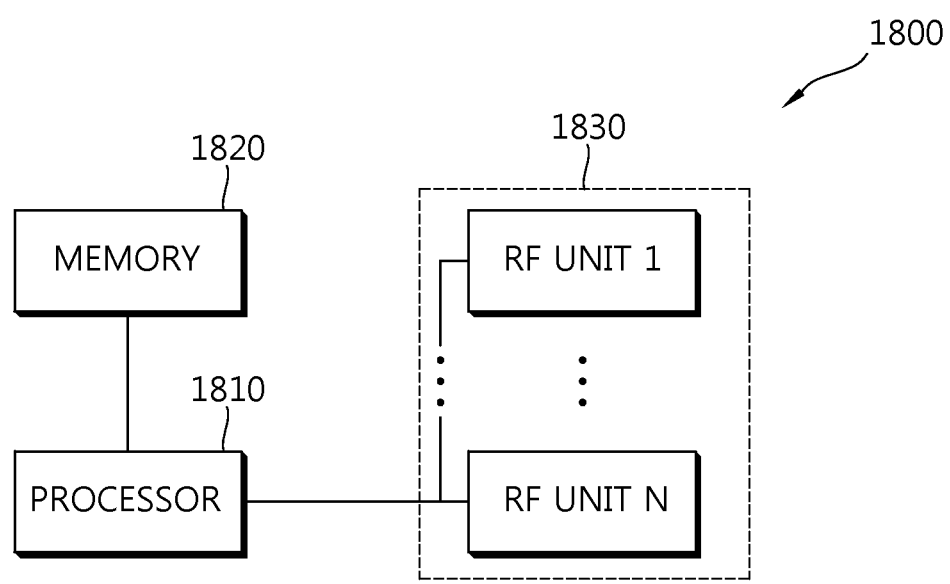
FIG. 18 is a block diagram illustrating a wireless apparatus in which the embodiment of the present invention may be implemented.

FIG. 18 is a block diagram illustrating a wireless apparatus in which the embodiment of the present invention may be implemented. The apparatus may implement the terminal and/or the access network entity in the embodiment of FIGS. 14 to 17.

Referring to FIG. 18, the wireless apparatus 1800 includes a processor 1810, a memory 1820, and a radio frequency (RF) unit 1830.

The processor 1810 implements a function, a process, and/or a method which are proposed. The processor 1810 is configured to obtain scaling factor information depending on a load level. The processor 1810 is configured to decide a mobility state of the wireless apparatus. The processor 1810 is configured to perform non-3GPP access network detection according to the mobility state of the wireless apparatus. The processor 1810 is configured to evaluate the traffic routing criterion based on the mobility state. The processor 1810 may be configured to perform the embodiment of the present invention described with reference to FIGS. 14 to 17.

The RF unit 1830 is connected with the processor 1810 to transmit and/or receive a radio signal. The RF unit 1830 may include one or more RF units for 3GPP based access network communication and non-3GPP based access network communication.

The processor 1810 may include an application-specific integrated circuit (ASIC), different chip sets, a logic circuit, and/or a data processing apparatus. In FIG. 18, it is illustrated that the single processor 1810 is configured to control and manage all RF units for each access network communication, but the wireless apparatus according to the present invention is not limited thereto. An embodiment in which the respective RF units for each access network communication are functionally coupled with the respective processors may be available.

The memory 1820 may include a read-only memory (ROM), a random access memory (RAM), a flash memory, a memory card, a storage medium, and/or other storage device. The RF unit 1830 may include a baseband circuit for processing the radio signal. When the embodiment is implemented by software, the aforementioned technique may be implemented by a module (a process, a function, and the like) performing the aforementioned function. The module may be stored in the memory 1820 and may be executed by the processor 1810. The memory 1820 may be present inside or outside the processor 1810 and connected with the processor 1810 by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for communicating carried by a terminal in a wireless communication system, the method comprising:
   receiving, from a first access network, a second access network detection configuration for detecting a second access network;
   receiving a traffic routing configuration from the first access network,
   wherein the traffic routing configuration specifies a traffic routing criterion for routing and processing traffic of the first access network to the second access network;
   deciding a mobility state of the terminal,
   wherein the mobility state of the terminal is classified by a speed of the terminal;
   detecting the second access network based on the second access network detection configuration,
   wherein the detecting of the second access network is performed based on the decided mobility state of the terminal;
   determining whether a second access network entity discovered by the detection satisfies the traffic routing criterion; and
   processing the traffic of the first access network through the second access network entity when the traffic routing criterion is satisfied,
   wherein at least one of the discovering of the second access network and evaluating whether the traffic routing criterion is satisfied is performed based on the decided mobility state of the terminal,
   wherein the second access network detection configuration includes a detection parameter set and one or more scaling parameter sets,
   wherein the detection parameter set is used to specify a second access network detection period, and
   wherein the one or more scaling parameter sets are used to scale the second access network detection period according to the mobility state of the terminal.

2. The method of claim 1, wherein the evaluating whether the traffic routing criterion is satisfied is performed based on the decided mobility state of the terminal.

3. The method of claim 2, wherein the traffic routing criterion indicates the mobility state of the terminal in which the traffic of the first access network is permitted to be routed and processed to the second access network.

4. The method of claim 3, wherein the evaluating whether the traffic routing criterion is satisfied includes deciding that a traffic criterion is satisfied when the decided mobility state of the terminal corresponds to the mobility state indicated by the traffic routing criterion.

5. The method of claim 2, wherein the traffic routing criterion indicates the mobility state of the terminal in which the traffic of the first access network is not permitted to be routed and processed to the second access network.

6. The method of claim 5, wherein the evaluating whether the traffic routing criterion is satisfied includes deciding that traffic criterion is satisfied when the decided mobility state of the terminal does not correspond to the mobility state indicated by the traffic routing criterion.

7. The method of claim 1, wherein the second access network detection configuration includes one or more detection parameters for specifying a second access network detection period according to the mobility state of the terminal.

8. The method of claim 7, wherein:
   the detecting of the second access network includes
   activating a function for communication with the second access network during the specified second access network detection period according to the decided mobility state of the terminal, and
   scanning the second access network during the second access network detection period.

9. The method of claim 1, wherein:
   the detecting of the second access network includes
   scaling the second access network detection period by applying a scaling parameter set corresponding to the decided mobility of the terminal,
   activating the function for the communication with the second access network during the scaled second access network detection period, and
   scanning the second access network during the scaled second access network detection period.

10. The method of claim 1, wherein:
    the first access network is a 3rd generation partnership project (3GPP) based access network, and
    the second access network is a wireless local area network (WLAN) based access network.

11. A wireless apparatus that operates in a wireless communication system, the wireless apparatus comprising:
    a radio frequency (RF) unit which transmits or receives a radio signal; and
    a processor which operates in functional association with the RF unit,
    the process is configured to
    receive, from a first access network, a second access network detection configuration for detecting a second access network,
    receive a traffic routing configuration from the first access network,
    wherein the traffic routing configuration specifies a traffic routing criterion for routing and processing traffic of the first access network to the second access network,
    decide a mobility state of the wireless apparatus,
    Wherein the mobility state of the wireless apparatus is classified by a speed of the wireless apparatus,
    detect the second access network based on the second access network detection configuration, wherein the detecting of the second access network is performed based on the decided mobility state of the wireless apparatus, evaluate whether a second access network entity discovered by the detection satisfies the traffic routing criterion, and process the traffic of the first access network through the second access network entity when the traffic routing criterion is satisfied, wherein at least one of the discovering of the second access network and the evaluating whether the traffic routing criterion is satisfied is performed based on the decided mobility state of the wireless apparatus, wherein the second access network detection configuration includes a detection parameter set and one or more scaling parameter sets, wherein the detection parameter set is used to specify a second access network detection period, and wherein the one or more scaling parameter sets are used to scale the second access network detection period according to the mobility state of the wireless apparatus.

* * * * *